(12) United States Patent
Collings et al.

(10) Patent No.: US 12,189,337 B2
(45) Date of Patent: Jan. 7, 2025

(54) SPATIAL LIGHT MODULATION

(71) Applicant: DUALITAS LTD, Milton Keynes (GB)

(72) Inventors: Neil Collings, Milton Keynes (GB); William Crossland, Milton Keynes (GB); Jamieson Christmas, Milton Keynes (GB)

(73) Assignee: DUALITAS LTD, Milton Keynes (GB)

(*) Notice: Subject to any disclaimer, the term of this patent is extended or adjusted under 35 U.S.C. 154(b) by 580 days.

(21) Appl. No.: 17/615,348

(22) PCT Filed: Jul. 2, 2020

(86) PCT No.: PCT/EP2020/068712
§ 371 (c)(1),
(2) Date: Nov. 30, 2021

(87) PCT Pub. No.: WO2021/001494
PCT Pub. Date: Jan. 7, 2021

(65) Prior Publication Data
US 2022/0221823 A1 Jul. 14, 2022

(30) Foreign Application Priority Data
Jul. 2, 2019 (GB) .................................. 1909513

(51) Int. Cl.
*G03H 1/22* (2006.01)
*G02F 1/1362* (2006.01)
*G02F 1/139* (2006.01)

(52) U.S. Cl.
CPC ..... *G03H 1/2294* (2013.01); *G02F 1/136277* (2013.01); *G02F 1/139* (2013.01);
(Continued)

(58) Field of Classification Search
CPC . G02F 1/136277; G02F 1/139; G02F 2203/12
(Continued)

(56) References Cited

U.S. PATENT DOCUMENTS

2003/0063232 A1* 4/2003 Hirota ................. G02F 1/1393
349/63
2005/0157264 A1* 7/2005 Chen ..................... G03B 21/14
353/20

FOREIGN PATENT DOCUMENTS

EP 1136872 A1 9/2001
EP 1298484 A2 4/2003
(Continued)

OTHER PUBLICATIONS

International Search Report and Written Opinion for Int. App. No. PCT/EP2020/068712, mailed Oct. 9, 2020.
(Continued)

*Primary Examiner* — Charles S Chang
(74) *Attorney, Agent, or Firm* — McDonnell Boehnen Hulbert & Berghoff LLP

(57) ABSTRACT

There is disclosed a projector arranged to project a light pattern. The projector comprises a spatial light modulator and a light source. The spatial light modulator has an array of pixels arranged to display a phase pattern. The array of pixels may be a substantially planar array of pixels. Each pixel comprises liquid crystals having a director rotatable in a plane of rotation between a first direction and a second direction. The light source is arranged to illuminate the array of pixels with polarised light such that the light is spatially-modulated in accordance with the phase pattern to form the light pattern. It may be said that the light pattern corresponds to the phase pattern. The angle of incidence of the light on the array of pixels is greater than zero and the light is s-polarised. The first direction is parallel to the polarisation direction of the light. The second direction is in the plane of incidence.

22 Claims, 16 Drawing Sheets

(52) U.S. Cl.
CPC ......... *G03H 1/2205* (2013.01); *G03H 1/2286* (2013.01); *G02F 2203/12* (2013.01); *G03H 2001/2231* (2013.01); *G03H 2222/31* (2013.01); *G03H 2225/22* (2013.01); *G03H 2225/32* (2013.01)

(58) Field of Classification Search
USPC .......................................................... 349/5
See application file for complete search history.

(56) References Cited

FOREIGN PATENT DOCUMENTS

| | | | |
|---|---|---|---|
| GB | 2568021 | A | 5/2019 |
| JP | 2008276062 | A | 11/2008 |
| NO | 2019/048867 | A1 | 3/2019 |
| WO | 2017/115080 | A1 | 7/2017 |

OTHER PUBLICATIONS

Combined Search and Examination Report for GB App. No. 1909513.2 dated Dec. 13, 2019.

\* cited by examiner

//  SPATIAL LIGHT MODULATION

CROSS-REFERENCE TO RELATED APPLICATIONS

This application is a U.S. National Stage application of International Patent Application PCT/EP2020/068712, filed Jul. 2, 2020, which claims the benefit of priority of United Kingdom Patent Application no. 1909513.2, filed Jul. 2, 2019.

FIELD

The present disclosure relates to a projector. More specifically, the present disclosure relates to a holographic projector, a method of holographic projection and holographic projection system.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. Liquid crystal on silicon, "LCoS", spatial light modulators exploit the birefringence of liquid crystals to provide controllable phase modulation. The ideal phase modulator would be able to provide a variable phase retardation between zero and $2\pi$. The birefringence of the liquid crystal determines the optical path length required to provide the full $2\pi$ phase retardation. Specifically, the optical path length range for a reflective modulator should equal $2\pi$. The optical path length increases with the thickness of the liquid crystal layer (d), the birefringence of the liquid crystal ($\Delta n$) and the angle of incidence ($\theta$). However, the speed at which the liquid crystals can be switched between the first state and the second state decreases with d. Motivated by a desired to increase switching speed, industry has been demanding higher birefringence liquid crystals.

Further motivated by a desire to increase resolution, industry has also been demanding small pixels. However, as the linear dimension of each pixel approaches the liquid crystal thickness, fringing electric fields at the edges of the pixels distort the otherwise uniform phase modulation of the pixel. The effective phase retardation of each pixel then becomes different from the intended values.

The inventors have addressed these problems. A holographic projector may be provided using the concepts described herein. Such projectors have found application in head-up displays, "HUD", and head-mounted displays, "HMD", including near-eye devices, for example.

SUMMARY

Aspects of the present disclosure are defined in the appended independent claims.

There is disclosed a projector arranged to project a light pattern. The projector comprises a spatial light modulator and a light source. The spatial light modulator has an array of pixels arranged to display a phase pattern. The array of pixels may be a substantially planar array of pixels. Each pixel comprises liquid crystals having a director rotatable in a plane of rotation between a first direction and a second direction. The light source is arranged to illuminate the array of pixels with polarised light such that the light is spatially-modulated in accordance with the phase pattern to form the light pattern. It may be said that the light pattern corresponds to the phase pattern. The angle of incidence of the light on the array of pixels is greater than zero and the light is s-polarised. The first direction is parallel to the polarisation direction of the light. The second direction is in the plane of incidence.

The first direction corresponds to a maximum refractive index of the liquid crystal and the second direction corresponding to a minimum refractive index of the liquid crystal, or vice versa. The liquid crystals are rotatable in a plane of rotation between a first direction and a second direction to provide a variable effective refractive index and therefore a variable phase delay.

A technical advantage is that at least phase-mostly modulation is achieved with access to the full birefringence of the liquid crystal. Access to the full birefringence enables the thickness of the liquid crystal light modulating layer to be minimised. A further technical advantage is that substantially the full birefringence of the liquid crystal can be accessed for any angle of incidence. Providing this access regardless of angle of incidence means that oblique incidence can be used and the thickness of the liquid crystal layer can be further decreased. Liquid crystal switching speed decreases with the square of the thickness of the liquid crystal layer. The reductions in thickness that can be achieved in accordance with the present disclosure provide significant increases in switching speed. Furthermore, full $2\pi$ phase modulation can be achieved with thinner films and/or more conventional liquid crystal mixtures than is possible with conventional normal incidence illumination.

The first direction may correspond to a planar state of the liquid crystal and the second direction may correspond to a homeotropic state of the liquid crystal. A technical advantage is that the electro-optic configuration in accordance with the present disclosure may be implemented using a conventional liquid crystal on silicon device. More specifically, it may be said that the first state corresponds to the liquid crystals being orientated in a planar state. The term "planar" is used herein to mean the plane containing the array of pixels. The term "homogeneous" describes the state of the liquid crystal when its director is in the plane containing the array of pixels. The term "homeotropic"

describes the state of the liquid crystal when its director is perpendicular to the plane containing the array of pixels.

The first direction may correspond to a first planar state and the second direction may correspond to a second planar state. The first direction is different to the second direction. The angle between the first direction and second direction on the plane of rotation may be substantially 90 degrees. A technical advantage is that the electro-optic configuration in accordance with the present disclosure may be implemented using in-plane switching.

Rotation between the first direction and second direction may comprise in-plane rotation and out-of-plane rotation. The term "in-plane" is used herein to mean a rotation in the plane containing the array of pixels. The term "out-of-plane" is used herein to mean out of the plane containing the array of pixels.

The second direction may be parallel to or collinear with the k-vector of the light incident upon the spatial light modulator. An important special case occurs when the optic axis of the liquid crystal is tilted into the incident direction. In this case there is no polarisation crossover at intermediate positions and the phase modulation is both full (i.e. the full birefringence of the liquid crystal used) and the modulation is phase-only (i.e. no polarisation crossover). In this case, the plane of rotation corresponds to the plane of the polarisation and the wave vector of the incident light. In other words; in this case, the illuminating polarised light has a plane of vibration which is coincident with the plane of rotation of the director.

Rotation between the first direction and second direction may comprises in-plane rotation and out-of-plane rotation.

The director of the liquid crystals may be maintained in the first direction by an electric field and, in the absence of the electric field, maintained in the second direction by a liquid crystal alignment layer.

The angle between the first direction and second direction in the plane of rotation may be substantially 90 degrees.

The phase pattern may comprise at least one selected from the group comprising: a hologram; a lensing function such as a Fresnel lens; and a beam-steering function such as a phase-ramp function.

The spatial light modulator may be a liquid crystal on silicon spatial light modulator.

The angle of incidence of the light on the array of pixels may be approximately equal to Brewster's angle for silicon. Accordingly, the liquid crystal may be deposited directly onto silicon. This eliminates the need for a reflective layer. This is particularly significant if lateral electrodes are required for in-plane switching.

The silicon surface of the liquid crystal on silicon spatial light modulator may be coated with $SiO_2$ such as 50-500 nm of $SiO_2$. Accordingly, the reflectivity of the substrate is increased for oblique incidence.

The light incident upon the array of pixels may be structured light comprising a plurality of light spots, wherein each light spot is arranged to illuminate a respective pixel of the array of pixels. More specifically, structured light is a light pattern comprising a plurality of individual light spots wherein each pixel of the array of pixels is illuminated by a respective light spot of the plurality of individual light spots. The structured illumination comprises light spots that are smaller than the pixels. The diameter of each light spot may be less than a smallest dimension of the pixel (e.g. pixel width). For example, the diameter of each light spot may be less than 90%—such as less than 85% or less than 80%—the pixel size or smallest pixel dimension. This is advantageous because it allows the effects of fringing fields to be reduced or even eliminated and it reduces or even prevents light crossing over into adjacent pixels. Structured illumination is further advantageous in computer-generated holography because it better reflects the mathematic assumptions or conditions during hologram calculation. Specifically, it is more consistent with the hologram calculation algorithm that assumes each pixel acts as a point source of light.

The projector may further comprise a spot-generating hologram or microlenslet array arranged to form the structured light.

The length to width aspect ratio of each pixel may be 2:1 to 5:1, wherein the length is parallel to the plane of incidence of the polarised light and the width is perpendicular to the length. Accordingly, traversal of the light ray through the liquid crystal volume above adjacent pixels in the long axis can be avoided. This will reduce interpixel crosstalk.

There is also disclosed a method of projecting a light pattern, the method comprising displaying a phase pattern on an array of pixels of a spatial light modulator, wherein each pixel comprises liquid crystals having a director rotatable in a plane of rotation between a first direction and a second direction; and illuminating the phase pattern with polarized light such that the light is spatially-modulated in accordance with the phase pattern to form the light pattern. According to the method;

(i) the angle of incidence of the light on the array of pixels is greater than zero and the light is s-polarised;
(ii) the first direction is parallel to the polarisation direction of the light; and
(iii) the second direction is in the plane of incidence.

The polarised light may be structured light comprising a plurality of light spots in which each light spot is arranged to illuminate a respective pixel of the array of pixels.

There is also disclosed a projector arranged to project a light pattern. The projector comprises a spatial light modulator and a light source. The spatial light modulator has an array of pixels arranged to display a phase pattern. The array of pixels may be a substantially planar array of pixels. Each pixel comprises liquid crystals having a director rotatable in a plane of rotation between a first direction and a second direction. The light source is arranged to illuminate the array of pixels with polarised light such that the light is spatially-modulated in accordance with the phase pattern to form the light pattern. It may be said that the light pattern corresponds to the phase pattern. The polarised light is structured light comprising a plurality of light spots. Each light spot illuminates a respective pixel of the array of pixels.

More specifically, structured light is a light pattern comprising a plurality of individual light spots wherein each pixel of the array of pixels is illuminated by a respective light spot of the plurality of individual light spots. Yet more specifically, the spatial profile of the polarised light comprises a plurality of individual or discrete light spots. There is a one-to-one relationship between the light spots and the pixels. Each light spot illuminates only one pixel of the array of pixels. The number of light spots may be equal to or greater than the number of pixels.

Structured illumination is advantageous because it allows the effects of fringing fields to be reduced or even eliminated and it reduces or even prevents pixel crosstalk such as light crossing over into adjacent pixels.

The light source may comprise a spot-generating hologram (or diffractive optic element) or microlenslet array arranged to form the structured light.

The structured illumination comprises light spots that are smaller than the pixels. The diameter of each light spot may be less than a smallest dimension of the pixel (e.g. pixel width). For example, the diameter of each light spot may be less than 90%—such as less than 85% or less than 80% or less than 75%—the pixel size or smallest pixel dimension. Each microlens may have a numerical aperture of 0.05 to 0.25 such as 0.1 to 0.2.

The projector may further comprise a hologram generation engine arranged to generate the phase pattern using an iterative phase retrieval algorithm. Structured illumination is further advantageous in computer-generated holography because it better reflects the mathematic assumptions or conditions during hologram calculation. Specifically, it is more consistent with computational algorithms that assumes each pixel acts as a point source of light.

Computer-implemented algorithms are based on the Huygens-Fresnel principle that each point on a wavefront acts as a source of spherical wavelets.

The structured illumination may be incident upon the array of pixels at an oblique angle. That is, structured illumination may be combined with oblique incidence. The angle of incidence of the structured light on the array of pixels may be greater than zero. Oblique incidence allows the thickness of the liquid crystal layer to be decreased and therefore the switching speed to be increased. Structured illumination is particularly advantageous with oblique incidence because it allows the effects of fringing fields to be reduced or even eliminated.

The pixels may be rectangular. The length to width aspect ratio of each pixel may be such that the light received by each pixel does not crossover into another pixel owing to the angle of incidence. In accordance with this disclosure, the length of the pixel is parallel to the plane of incidence of the polarised light. The width of the pixel is perpendicular to the length. There is a lower limit to the size of the light spots of the structured illumination. The use of rectangular pixels with structured illumination allows the pixel size dimensions to be optimised.

The length to width aspect ratio of each pixel may be in the range 2:1 to 5:1. Traversal of the light ray through the liquid crystal volume above adjacent pixels in the long axis can be avoided. This will reduce interpixel crosstalk.

The phase pattern may comprise at least one selected from the group comprising: a hologram; a lensing function such as a Fresnel lens; and a beam-steering function such as a phase-ramp function.

The spatial light modulator may be a liquid crystal on silicon spatial light modulator.

The light pattern may be a holographic reconstruction.

There is also disclosed herein a method of projecting a light pattern. The method comprises a first step of displaying a phase pattern on an array of pixels of a spatial light modulator. Each pixel comprises liquid crystals having a director. The director is rotatable in a plane of rotation between a first direction and a second direction. The method comprises a second step of illuminating the phase pattern with polarised light. The polarised light is therefore spatially-modulated in accordance with the phase pattern to form the light pattern. The polarised light is structured light. The structured light (or illumination) comprises a plurality of light spots. Each light spot is arranged to illuminate a respective pixel of the array of pixels.

The method may further comprise calculating the phase pattern using an iterative phase retrieval algorithm. The method may further comprise receiving polarised light. The method may further comprise structuring the light using a spot-generating hologram or microlenslet array to form the structured light.

The light pattern may be projected onto a projection plane. The light pattern may be a 3D light pattern projected onto a projection volume. The projection plane or projection volume is spatially-separated from the spatial light modulator.

For the avoidance of any doubt, the liquid crystals in accordance with this disclosure are nematic and birefringent. Any reference herein to a single liquid crystal is made with respect to a representative liquid crystal in a liquid crystal layer or liquid crystal cell or liquid crystal mixture, as will be understood by the person skilled in the art.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality of diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
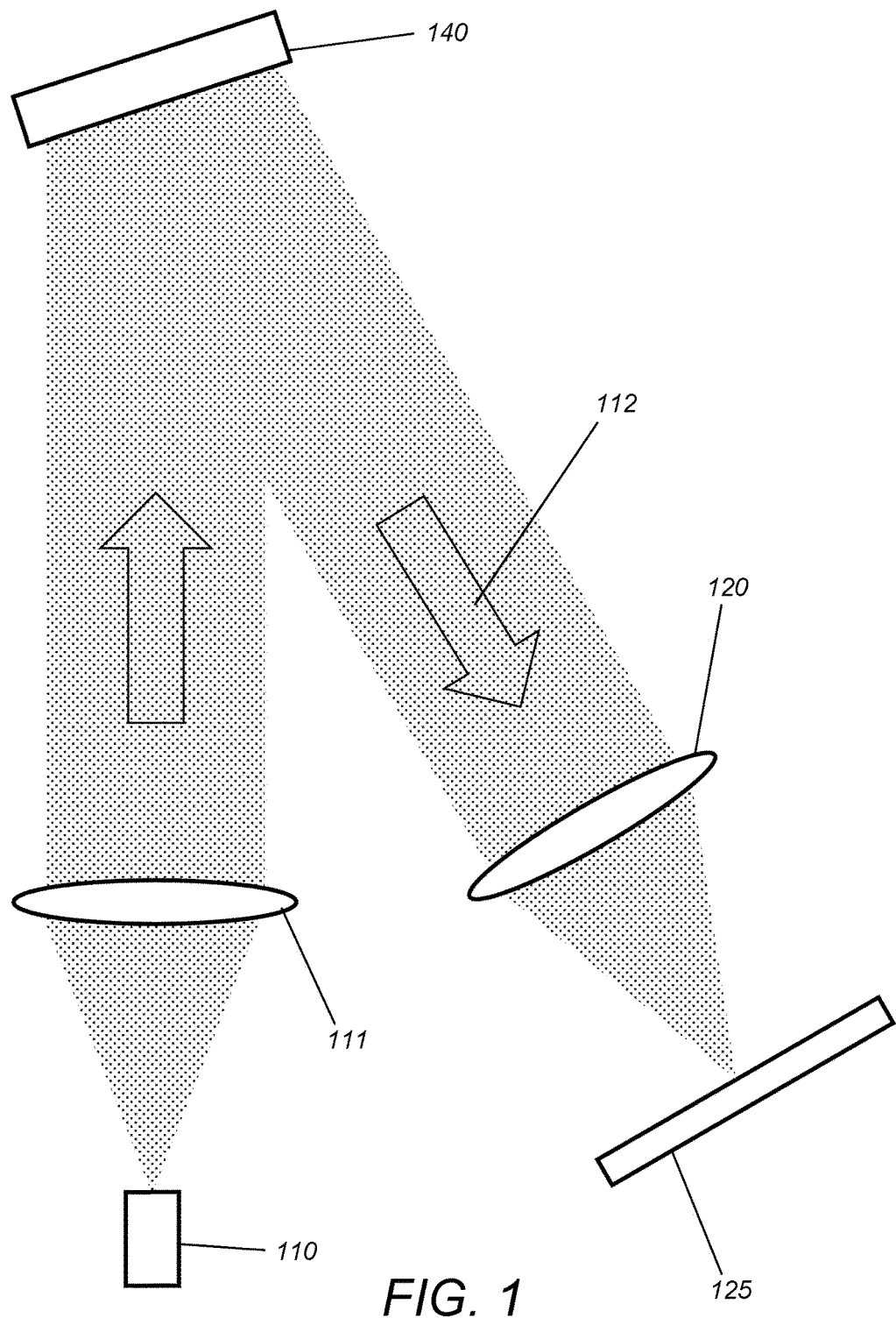
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
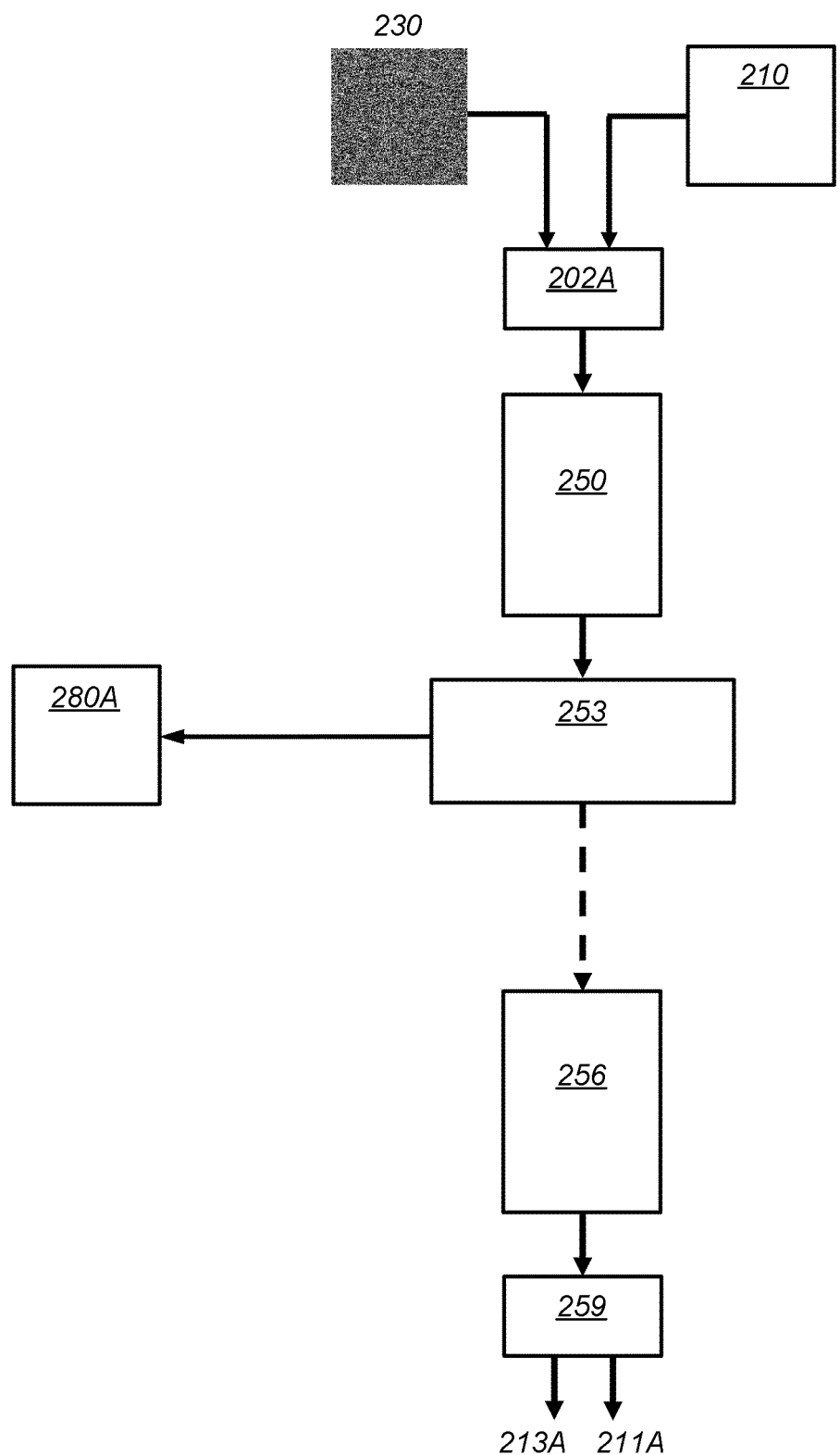
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
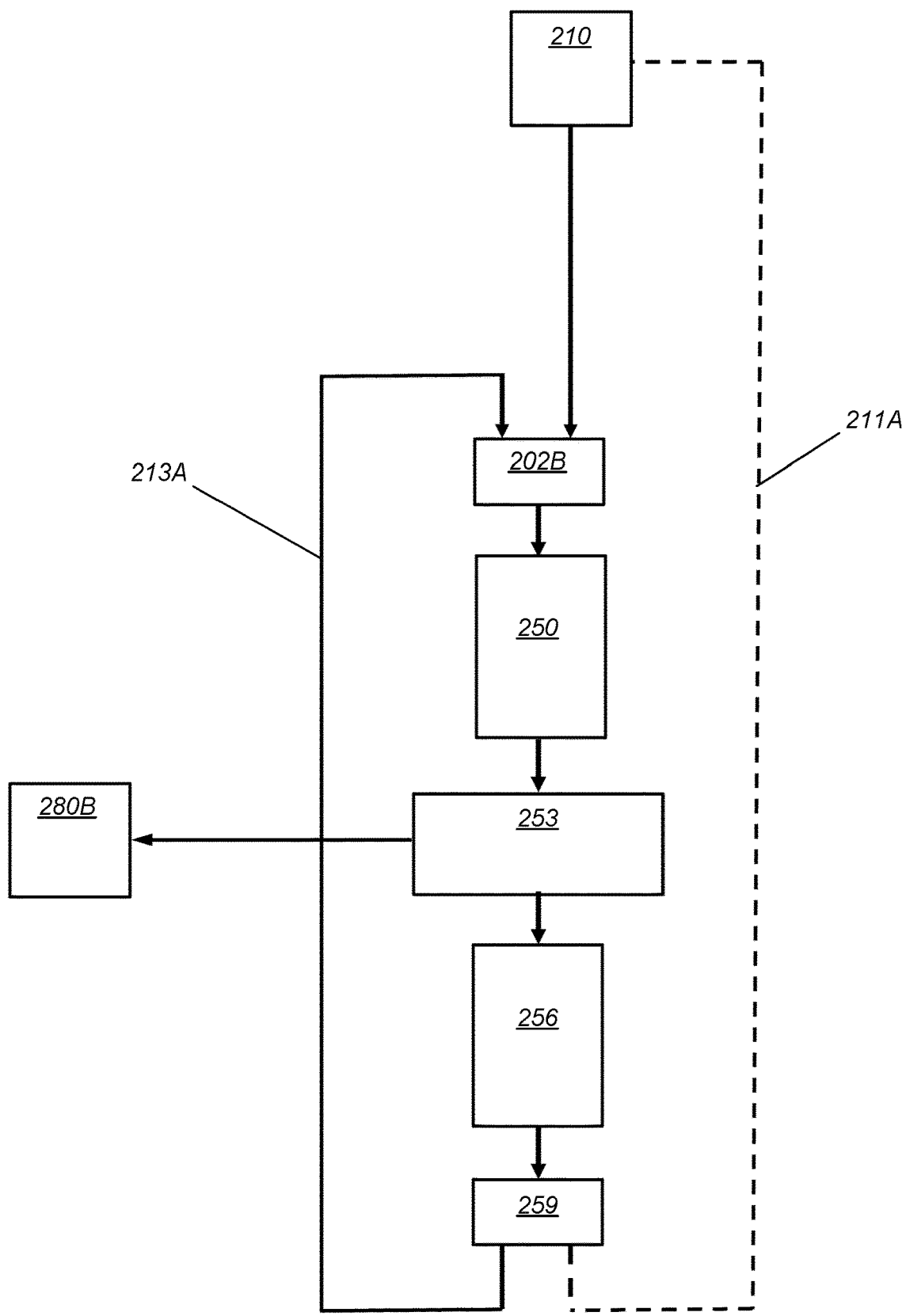
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
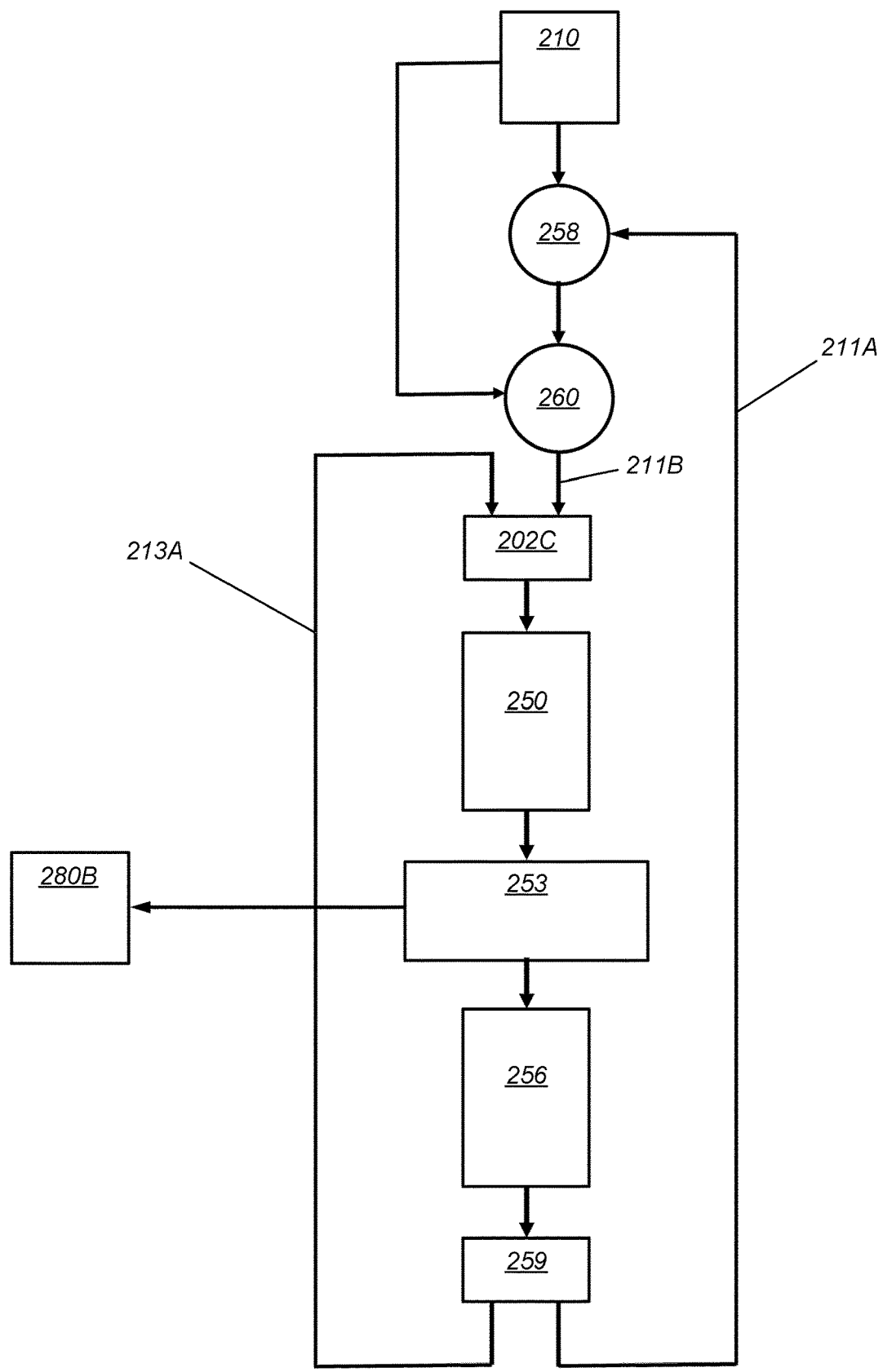
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{\exp(i\psi_n[u, v])\}$$

$$\psi_n[u, v] = \angle F\{\eta \cdot \exp(i \angle R_n[x, y])\}$$

$$\eta = T[x, y] - \alpha(|R_n[x, y]| - T[x, y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Phase Modulation Using Rotatable Liquid Crystals

Figure 3:
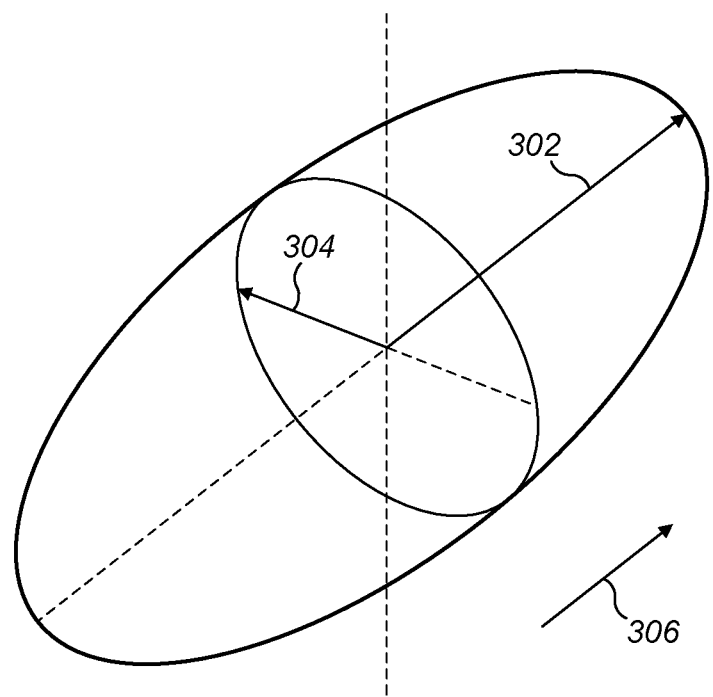
FIG. 3 shows the indicatrix of a nematic liquid crystal.

FIG. 3 shows the indicatrix or refractive index ellipsoid 300 of a nematic liquid crystal. It is an ellipsoid of revolution that depicts the orientation and magnitude of the refractive index. The indicatrix has a first axis 302 co-incident with the average direction of the long molecular axis in the liquid crystal medium and a second axis 304 associated with the short molecular axis. A director 306 indicates the general orientation of liquid crystals in the neighbourhood of a point of interest. More specifically, the director indicates the spatial and temporal average of the long molecular axes in a region. The director also indicates the direction of the optic axis of the liquid crystal.

The indicatrix indicates both the spatial variation and the magnitude of two refractive indices: an extraordinary refractive index, $n_e$ and an ordinary refractive index, $n_o$. Light that is linearly-polarised along the first axis 302 experiences the extraordinary refractive index, $n_e$. Light that is linearly-polarised in a direction along the second axis 304 experiences the ordinary refractive index, $n_o$. The birefringence of the liquid crystal, Δn, for light propagating normal to the long molecular axis is defined as the maximum difference between the refractive indices exhibited by the material and is given by:

$$\Delta n = n_e - n_o \quad (1)$$

The birefringence is zero for light propagating along the long molecular axis.

Figure 4:
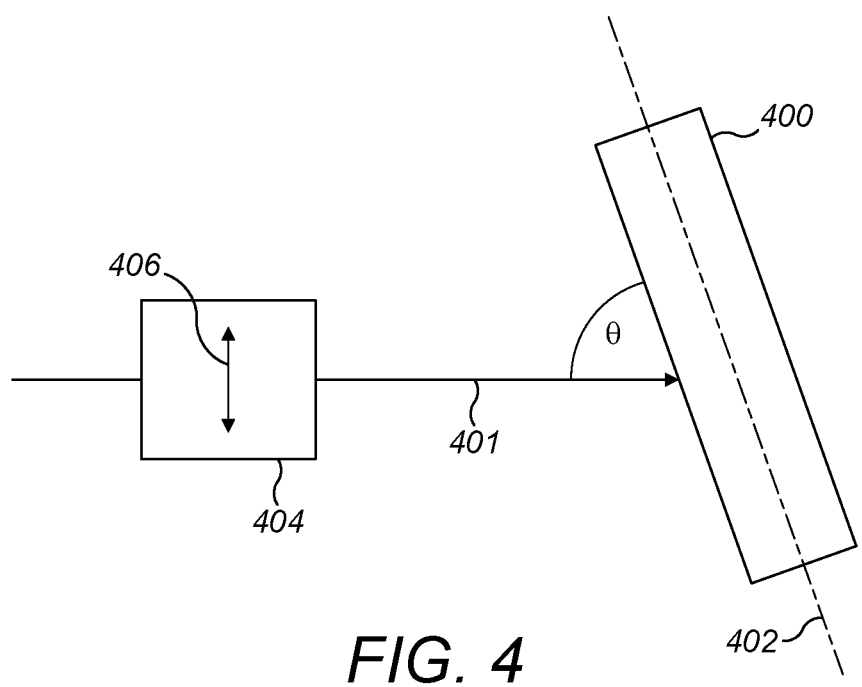
FIG. 4 shows light incident on a nematic liquid crystal whose indicatrix is tilted in the plane of incidence.

The indicatrix allows the birefringence experienced by light rays at any angle to be calculated. FIG. 4 shows light incident on a nematic liquid crystal whose indicatrix is tilted in the plane of incidence. The polarization direction 406 of the light is shown in the plane of vibration. The liquid crystal director 402, indicating the average orientation of the long molecular axis is also shown. In this configuration, the incidence light experiences an effective refractive index, $n_{eff}$, given by the equation:

$$n_{eff} = \frac{n_o n_e}{\sqrt{n_e^2 \cos^2 \vartheta + n_o^2 \sin^2 \vartheta}} \quad (2)$$

where θ is the angle between the long molecular axis and the light propagation direction.

The orientation of liquid crystals with respect to θ therefore determines the effective refractive index experienced and therefore a phase-delay to the light wave, which the tilted liquid crystals can impart. A phase-modulator may therefore be formed by controlling the orientation or tilt of liquid crystals using voltage.

Figure 5A:
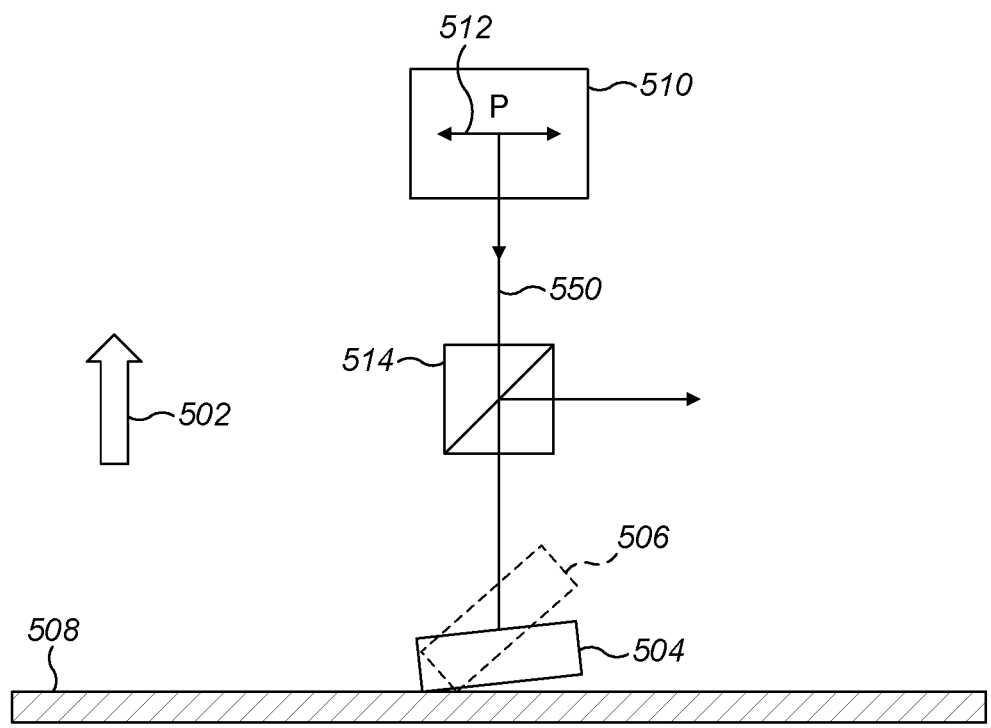
FIG. 5a shows a first example phase modulator using tilted nematic liquid crystals in accordance with the prior art.

FIG. 5a shows a first example phase modulator using tilted nematic liquid crystals in accordance with the prior art. An electro-optic phase modulator is formed by varying an electric field 502 experienced by the liquid crystals. In a first state 504, the electric field is switched off (V=0) and the tilt of the liquid crystals with respect an underlying reflective surface 508 is determined by a surface alignment layer. The surface alignment layer provides a so-called pre-tilt which may be a few degrees such as two degrees. In a second state 506, the electric field is maximum (V=V) and the tilt of the liquid crystals with respect to the reflective surface is maximum. The effective refractive index of the liquid crystals is therefore a function of the voltage. FIG. 5a shows the plane of vibration 510 and polarization direction 512 of the incident light 550. The incident light 550 is p-polarised. The phase modulator is reflective and a beam splitter 514 is used such that the incident light is normal to the reflective surface 508.

Figure 5B:
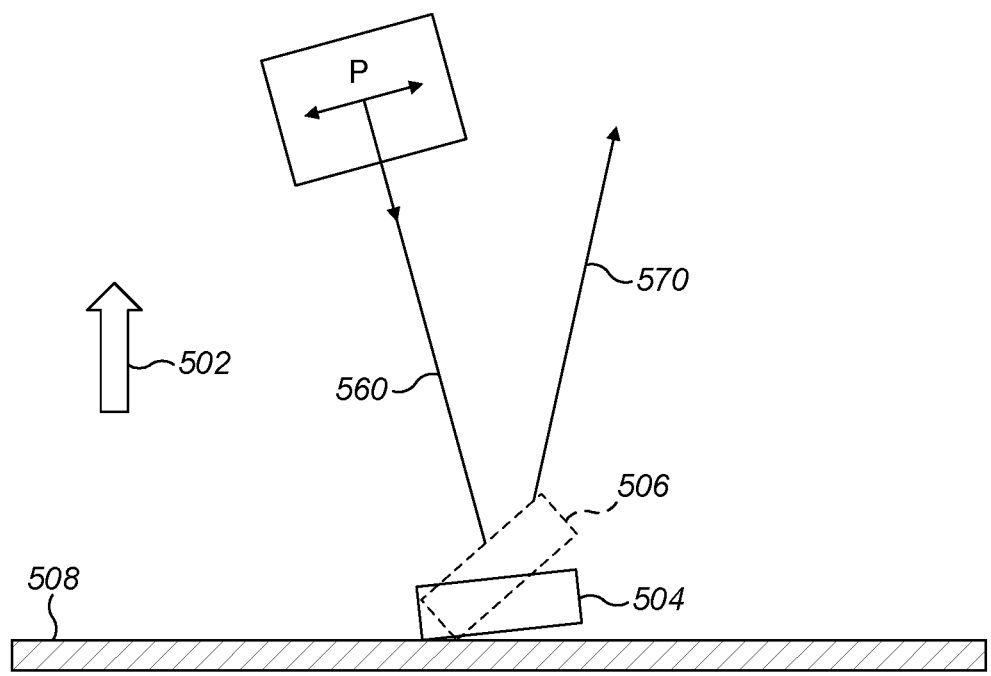
FIG. 5b shows a second example phase modulator using tilted nematic liquid crystals in accordance with the prior art.

FIG. 5b shows a second example phase modulator using tilted nematic liquid crystals in accordance with the prior art. In this example, the beam splitter is omitted and the incident light 560 is off-axis with respect to the normal of the reflective surface 508 so as to avoid overlap between the incident light 560 and the reflected light 570. In this example, the plane of vibration 520 is also the plane of incidence, wherein the plane of incidence is the plane containing the surface normal and the propagation vector (known as the k-vector) of the incident light 560.

It has become conventional for phase modulators to use p-polarised light. When light accesses the liquid crystal at normal incidence and the optical axis of the liquid crystal moves from being substantially parallel to the substrate (parallel, homogeneous alignment) to orthogonal to the substrate (homeotropic alignment) under the influence of an electric field, then substantially the full birefringence of the liquid crystal is accessed. This is because the optical path of the light through the liquid crystal changes by d·Δn, where d is the thickness of the liquid crystal layer. In practice, the Δn experienced by the light, at normal incidence, may be slightly less than the maximum possible difference in refractive index (i.e. $n_e - n_o$), due to the pre-tilt of the crystals, relative to the underlying reflective surface. However, in practice, if the pre-tilt is quite small, of the order of a few degrees, this may make little difference to the birefringence that is accessed at normal light incidence.

Oblique incidence Operating a liquid crystal on silicon device with light at an oblique angle of incidence causes the geometric path (l) through the liquid layer to be greater than its thickness (d). It can therefore enable the thickness of the liquid layer to be reduced and therefore its switching speed to be increased. The voltage-induced switching speed increases because the electric field across the LC increases and (more importantly) the speed of relaxation when the voltage is removed is higher for thinner liquid crystal layers.

Whilst the geometric path of light through the liquid crystal is always increased at oblique incidence, the optical path is usually decreased by the changed effective birefringence of the liquid crystal at the oblique angles. In other words; the effective optical path of light through the liquid crystal is contingent on both the length of its geometric path (l) and the effective birefringence that it experiences as it travels through the liquid crystal. Conventionally, when a liquid crystal on silicon device is operated with light at an oblique angle of incidence, the full birefringence of the liquid crystal is no longer accessed and the maximum change in refractive index that can be achieved by tilting the liquid crystal using an electric field is reduced to below Δn (where Δn is the maximum possible birefringence of the liquid crystal, when illuminated at normal incidence.) Therefore, although the geometric path (l) of the light through the liquid crystal is increased from d to d/sin θ due to the oblique incidence, the optical path is less than d/sin θ×Δn because the effective birefringence is reduced. If the reduction in effective birefringence outweighs the increase in the geometric path length (l), the oblique incidence can therefore reduce the optical path length of light through the liquid crystal.

The inventors have devised a new electro-optic configuration for phase modulation which unlocks the advantages of off-axis (i.e. oblique) illumination. In particular, the inventors have found a scheme which allows the full birefringence of the liquid crystal to be accessed when illuminating off-axis. Accordingly, switching speed can be increased.

FIG. 6 illustrate the scheme in its generality. Reference is made herein to a first state and a second state with respect to the two extreme orientations of the liquid crystal which are achievable during operation. In the first state, the director of the liquid crystals has a first direction on a plane of rotation. In the second state, the director of the liquid crystals has a second direction on the plane of rotation. The first state may correspond to a state in which the minimum refractive index is experienced by the incident light and the second state may correspond to a state in which the maximum refractive index is experienced.

Figure 6B:
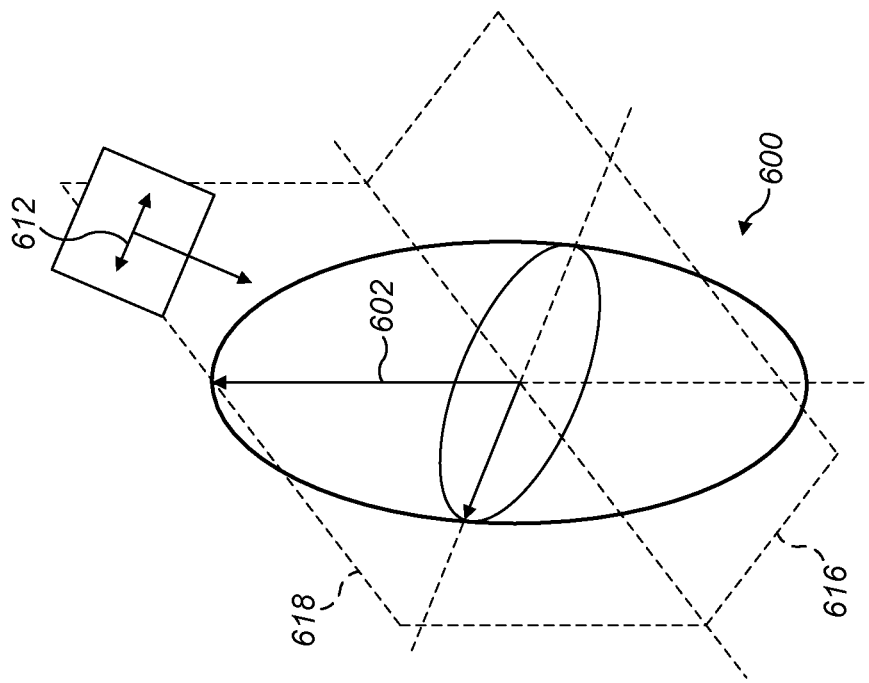
FIG. 6b shows a first example of a second state in accordance with oblique incidence.
Figure 6A:
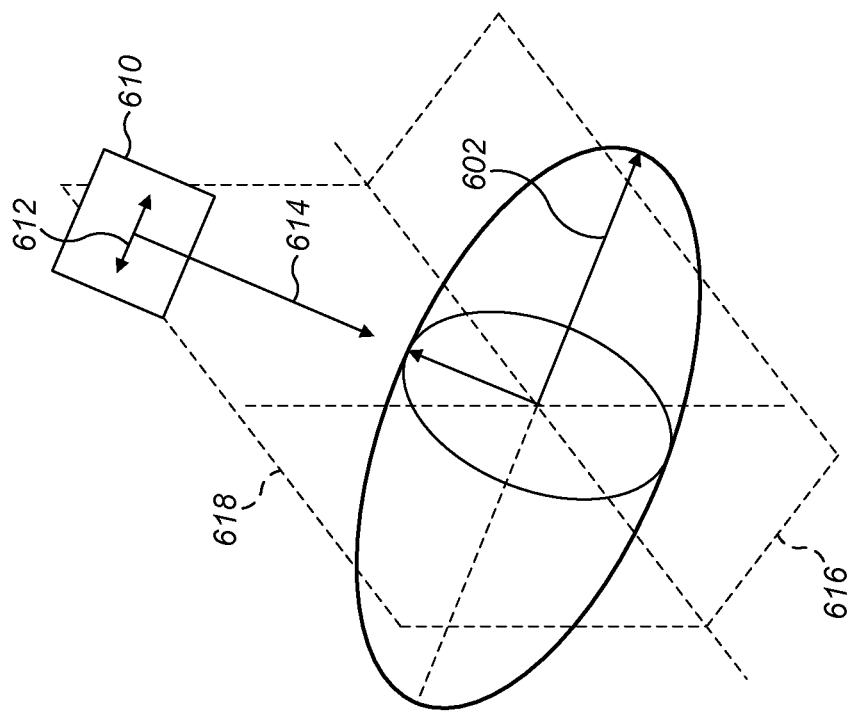
FIG. 6a shows a first state of a liquid crystal in accordance with oblique incidence.

FIG. 6a shows the first state in accordance with embodiments. The liquid crystal 600 is a representative liquid crystal of a liquid crystal layer. The liquid crystal 600 has a first axis 602 and second axis 604. The first axis 602 is parallel to the director of the liquid crystal. Light that is linearly-polarised along the first axis 602 experiences the extraordinary refractive index, $n_e$. Light that is linearly-polarised in a direction along the second axis 604 experiences the ordinary refractive index, $n_o$. In this example, the liquid crystal has positive optical anisotropy (i.e. $n_e > n_o$).

The liquid crystal 600 in FIG. 6a is shown in its position in the absence of a voltage (i.e. when the spatial light modulator in which the liquid crystal 600 is comprised is in a V=0 state.)

A layer of liquid crystals, represented by liquid crystal 600, are disposed on a reflective surface 616. It is therefore said that the liquid crystals are arranged in a planar state. In a similar manner to the crystal of FIG. 5a, an alignment has been made to provide a predefined 'pre-tilt' angle to the liquid crystal 600 with respect an underlying reflective surface 616. This predefined tilt angle can be determined by a surface alignment layer through any suitable technique, such as rubbing, which will be known to the skilled reader.

The liquid crystal layer is obliquely illuminated. The manner of the oblique illumination is selected and controlled in accordance with the new electro-optic configuration for phase modulation, which the present inventors have devised. FIG. 6a shows the plane of vibration 610, the polarization direction 612, the k-vector 614 of the incident light and the plane of incidence 618. The light is selected and controlled so that its polarization direction 612 is parallel to the first axis 602 (and director) of the liquid crystal 600. The refractive index experienced by the light in FIG. 6a is therefore $n_e$. We note that this is true for light at any angle in the plane of incidence, provided that the liquid crystal is aligned planar in a direction orthogonal to the plane of incidence. Therefore, the exact position of the incident light in FIG. 6a is just one example—other oblique angles of incidence, in the illustrated plane of incidence 618, may be selected for the incident light.

In order to correctly angle the incident light, the alignment of the crystal 600 (and therefore the directions of its first 602 and second 604 axes) should be known. The alignment can be pre-determined in any suitable manner, as described above, and may be checked or measured in any suitable manner. For example, crystal tilt may be measured using glass cells with the designated alignment layer and the liquid crystal 600. Once alignment is established, a light beam can be configured to provide the incident light at the appropriate angle. If necessary, the alignment can be fine-tuned, once the liquid crystal 600 is illuminated.

Figure 6D:
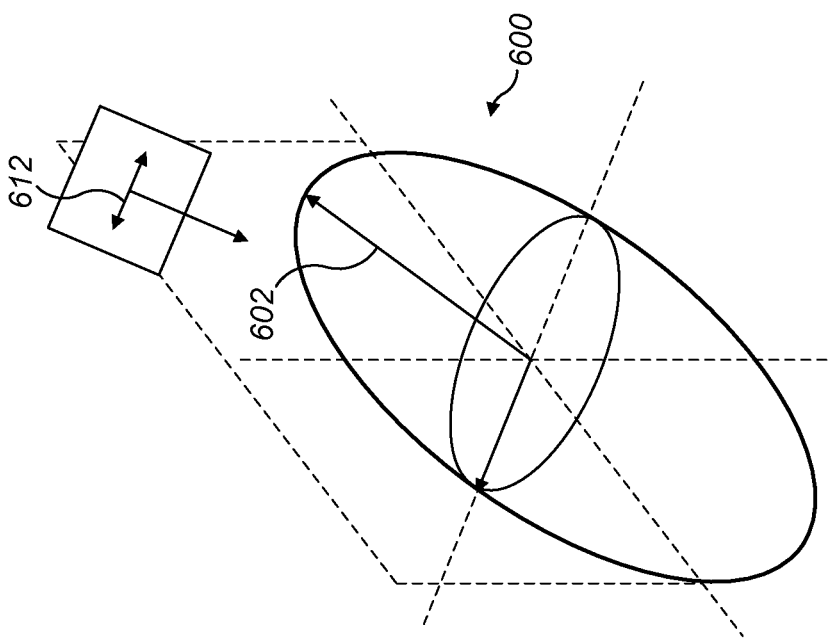
FIG. 6d shows a third example of the second state in accordance with oblique incidence.
Figure 6C:
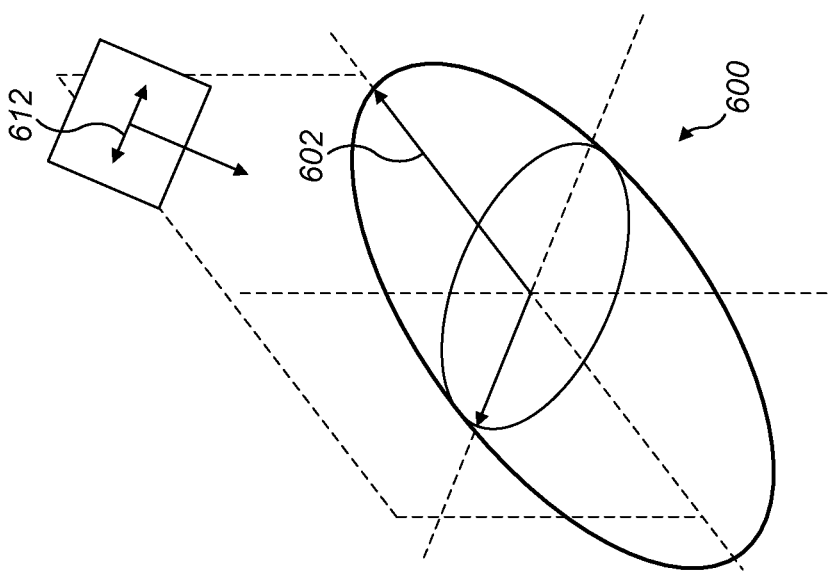
FIG. 6c shows a second example of the second state in accordance with oblique incidence.

Each of FIGS. 6b to 6d show a respective example of the liquid crystal 600 in a second state. In each of FIGS. 6b to 6d, the alignment of the liquid crystal has been changed, due to the application of a voltage (V) to the electrodes of the spatial light modulator, in which the liquid crystal 600 is comprised. As the skilled reader will recognise, the value of 'V' will vary, dependent on a number of factors such as cell thickness and so on. According to an example, V may be between 0 volts and 5 volts. As the skilled reader will know, when a voltage is applied across the electrodes (i.e. when V>0), the liquid crystal 600 will start to align with the field lines, so gets gradually pulled into a new alignment. FIGS. 6b to 6d show three possible such alignments, in accordance with the new electro-optic configuration described herein.

FIG. 6b shows a first example of the second state in accordance with embodiments. This first example of the second state may be achieved using any suitable liquid crystal on silicon (LCOS) device. The liquid crystal 600 has been rotated from a planar (or homogeneous) state to a homeotropic state, due to the presence of an electric field, caused by the application of a voltage (V) across the LCOS device. The director of the liquid crystals has been rotated by 90 degrees around an axis formed by the intersection of the plane of incidence 618 and the reflective surface 616. It may be said that the rotation is out of the plane. More specifically, the rotation is out of the plane of the reflective surface. When the rotation has occurred and the liquid crystal is in this first example of the second state, its director is therefore parallel to the surface normal of the reflective surface. The polarization direction 612 is parallel to the second axis and the light therefore experiences $n_o$. Again, we note that this also is true for light at any angle in the plane of incidence, provided that the liquid crystal is aligned planar in a direction orthogonal to the plane of incidence. Therefore, in rotating from its first state to its second state, the liquid crystal has experienced the maximum available change in refractive incidence, $\Delta n=n_e-n_o$, despite having been illuminated off-axis (i.e. obliquely).

The liquid crystal is rotatable between the first state and the first example of the second state by the application of an electric field orthogonal to the reflective surface 616. In the embodiments shown in FIGS. 6a to 6d, the liquid crystal has positive dielectric anisotropy. In these embodiments, therefore, the first state corresponds to the electric field being off (V=0) and the second state corresponds to the electric field being on (V=V). The inverse would be true for liquid crystals, in other embodiments, with a negative dielectric anisotropy. In either case, the first state (V=0) may be maintained by at least one surface alignment layer.

The electric field required to drive the liquid crystals between the first state and the second state in accordance with the first example may be achieved using transverse electrodes. The term transverse electrodes is used herein to refer to a configuration in which the first electrode is the reflective surface (e.g. aluminium) and the second electrode is a transparent electrode which is parallel to the first electrode (i.e. the electric field is transverse to the plane of the liquid crystal layer). The first electrode and second electrode define a cell containing the liquid crystals. Liquid crystal on silicon, "LCoS", spatial light modulators having transverse electrodes are known in the art and no further description is therefore required.

FIG. 6c shows a second example of the second state in accordance with embodiments. This second example of the second state may be achieved using any suitable liquid crystal on silicon (LCOS) device. The liquid crystal has been rotated from a first planar state to a second planar state. The director of the liquid crystals has been rotated by 90 degrees in the surface plane. It may be said that the rotation is in the plane. More specifically, the rotation is in the plane of the reflective surface 616. The polarization direction 612 is parallel to the first axis and the light therefore experiences $n_o$. Therefore, again, in rotating from its first state to its second state, the liquid crystal has experienced the maximum available change in refractive incidence, $\Delta n=n_e-n_o$, despite having been illuminated off-axis (i.e. obliquely).

The liquid crystal is rotatable between the first state and second state by an electric field parallel to the reflective surface. In some embodiments, the first state corresponds to the electric field being off (V=0) and the second state corresponds to the electric field being on (V=V).

The electric field required to drive the liquid crystals between the first state and the second state in accordance with the second example may be achieved using lateral electrodes. The term lateral electrodes is used herein to refer to a configuration in which the first electrode and second electrode are both lie in a plane parallel to the reflective surface 616. The first electrode and second electrode define a cell containing the liquid crystals. Liquid crystal rotation, or 'switching', in the plane is known as in-plane switching. Liquid crystal devices providing in-plane switching are known in the art and no further description is therefore required.

FIG. 6d shows a third example of the second state in accordance with embodiments. The liquid crystal has undergone both in-plane and out-of-plane rotation to arrive in the second state from the first state. This second example of the second state may be achieved using any suitable liquid crystal on silicon (LCOS) device. The director of the liquid crystal has been rotated by 90 degrees in a plane of rotation which is orientated in an intermediate position between the plane of rotation of the first example and the plane of rotation of the second example. The polarisation direction 612 is parallel to the first axis and the light therefore experiences $n_o$. Therefore, again, in rotating from its first state to its second state, the liquid crystal has experienced the maximum available change in refractive incidence, $\Delta n=n_e-n_o$, despite having been illuminated off-axis (i.e. obliquely).

The liquid crystal is rotatable between the first state and second state by an electric field having a direction in the plane of rotation. In some embodiments, the first state corresponds to the electric field being on (V=V) and the second state corresponds to the electric field being off (V=0).

The electric field required to drive the liquid crystals between the first state and the second state in accordance with the third example may be achieved using, for example, lateral electrodes, to provide in-plane switching. Liquid crystal devices providing in-plane switching are known in the art and no further description is therefore required.

In some embodiments, the third example of the second state corresponds to the state in which the electric field is off. The orientation of the liquid crystals in the second state may be achieved using at least one surface alignment layer. It is known in the art how to provide relatively high surface alignment angles. The first state, in this third example, may corresponding to the maximum voltage state. In this arrangement, the electric field is used to pull the liquid crystals down to a planar state. The skilled person will understand how to use an electric field to overcome the surface pre-tilt and align in the director as shown in FIG. 6a.

The liquid crystal may equally have negative dielectric anisotropy which may reverse the voltage on and voltage off states in all examples, as the person skilled in the art will understand.

The embodiments described with reference to FIG. 6 provide two significant advantages. Firstly, the full birefringence of the liquid crystal is accessed and, secondly, any angle of incidence can be used. Notably, oblique incidence is allowable without introducing the usual disadvantages associated therewith. In some embodiments, the angle of incidence is greater than 20 degrees such as greater than 40 degrees or greater than 60 degrees.

A preferred, or optimised, angle of oblique incidence may vary, between different LCOS devices and circumstances. By way of example, the angle of incidence may be chosen according to the reflectivity of the reflective surface 616. Another factor in selecting the liquid crystal configuration, which will determine the plane of incidence for incoming light, may be producing a stable crystal tilt alignment. Therefore, selecting an angle of incidence may be a trade-off between obtaining good reflectivity and finding a practical alignment for the liquid crystals.

Down-the-Barrel

In addition to the advantages described above, the inventors have provided a yet further improvement which is referred to herein as down-the-barrel. The inventors have realised that, in the schemes described with reference to FIG. 6, some polarisation crossover can occur in the intermediate states between the first state and second state. Some partial intensity modulation can therefore occur in addition to the phase modulation. In most practical cases, some intensity modulation can be tolerated or can be accommodated during hologram calculation. However, phase-only is ideal.

Polarisation crossover is the term used to describe the behaviour of the light modulating layer when an incident linear polarisation is reflected in a different state of polarisation such as elliptical, rotated linear, or depolarised. Polarisation crossover leads to a deviation from phase-only modulation. The inventors have identified a special case in which polarisation cross-over in the intermediate states is minimised or eliminated. This is illustrated in FIGS. 7 and 8.

Figure 7B:
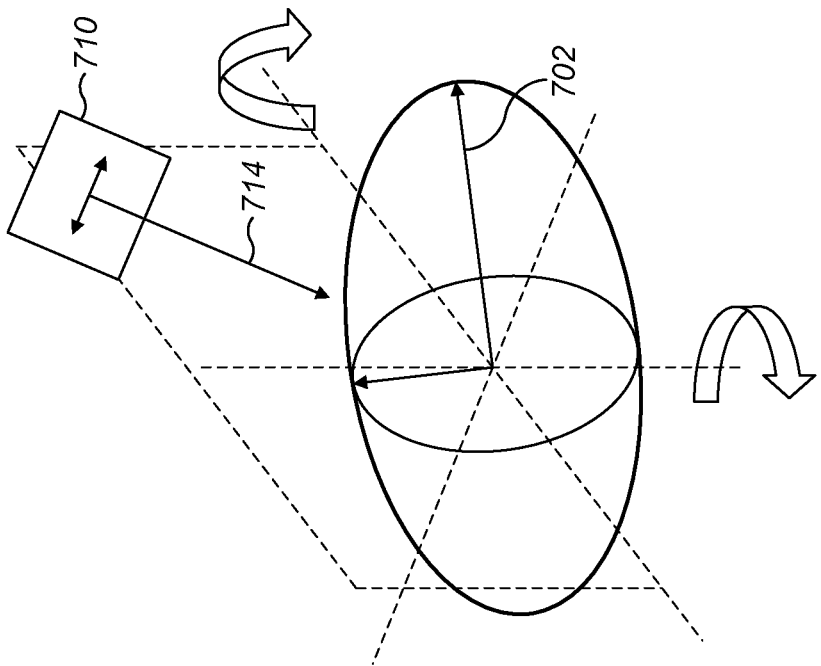
FIGS. 7b and 8b represent a first intermediate rotational state.
Figure 7A:
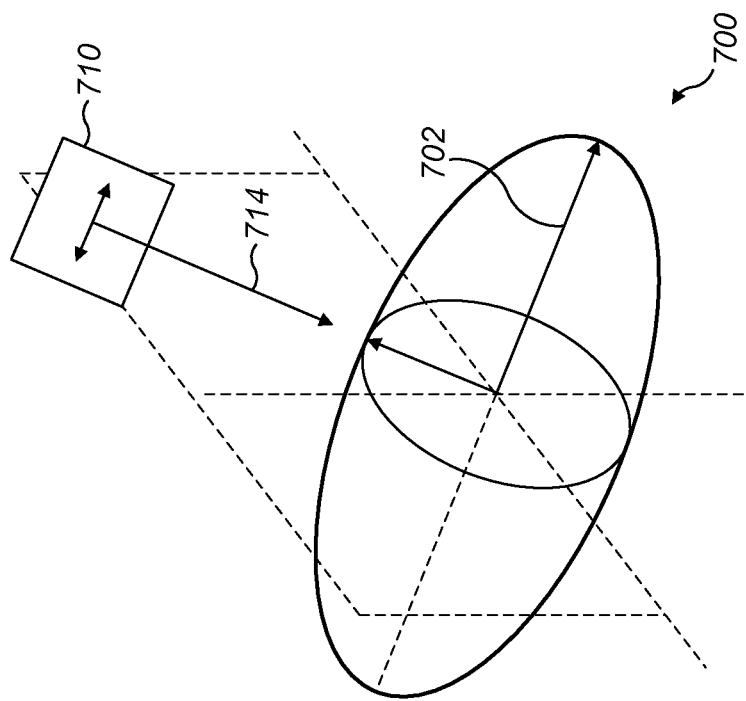
FIGS. 7a and 8a show the first state in accordance with the so-called down-the-barrel configuration.
Figure 7D:
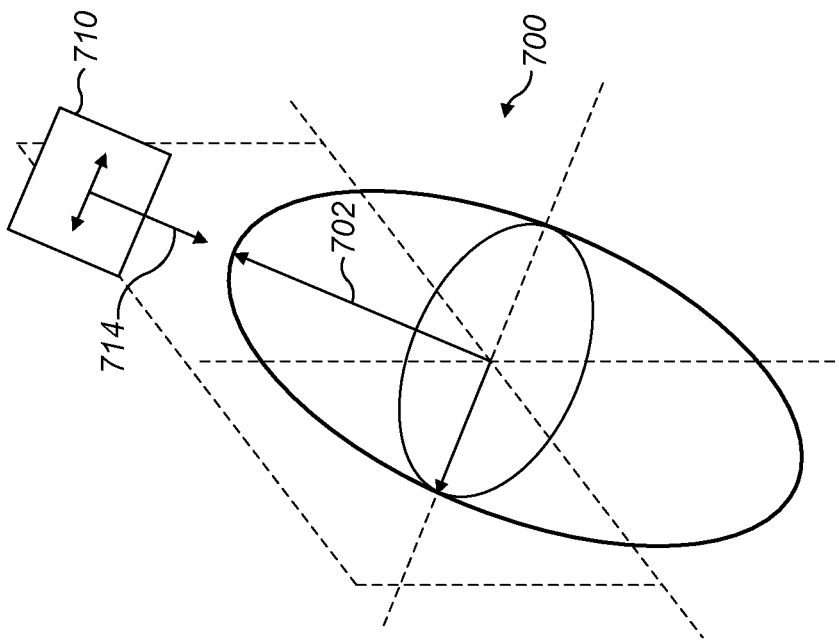
FIGS. 7d and 8d show the second state in accordance with down-the-barrel.
Figure 7C:
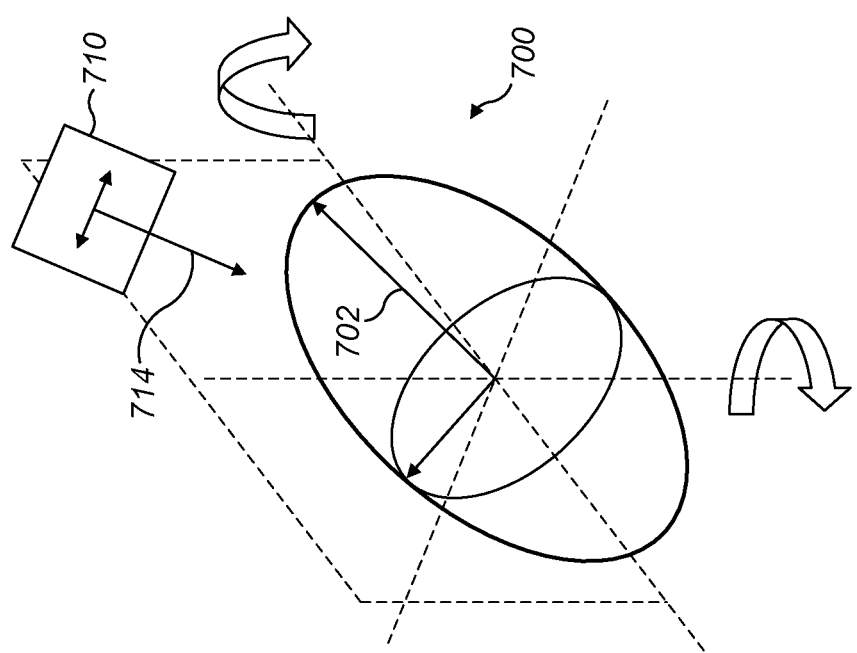
FIGS. 7c and 8c represent a second intermediate rotational state.
Figure 8A:
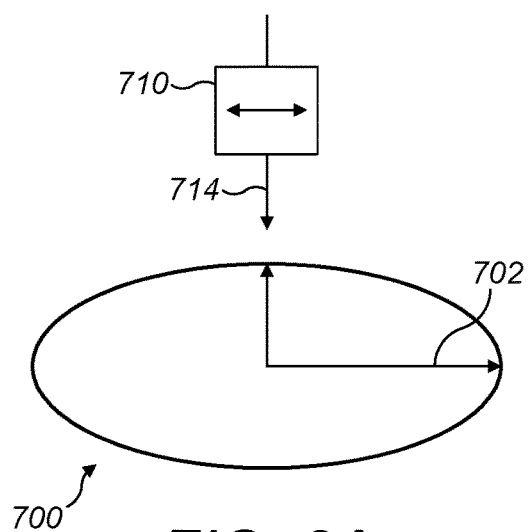
Figure 8B:
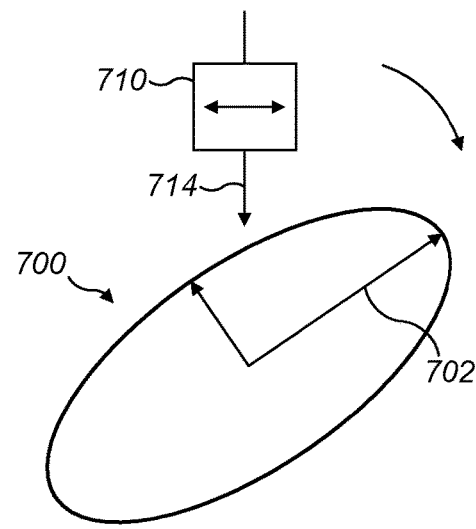
Figure 8C:
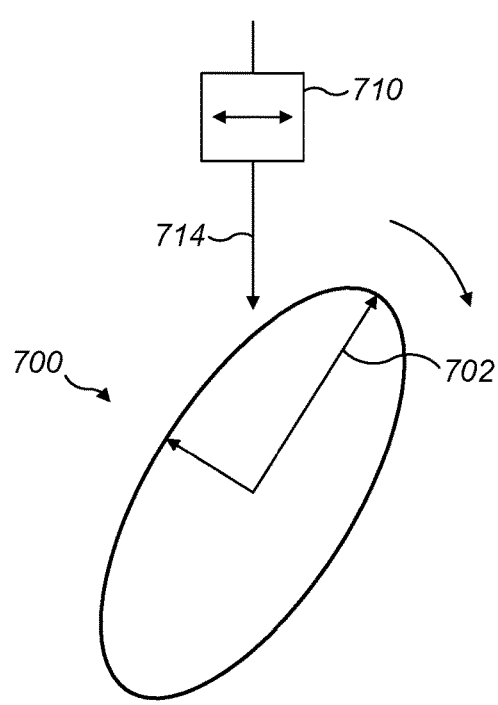
Figure 8D:
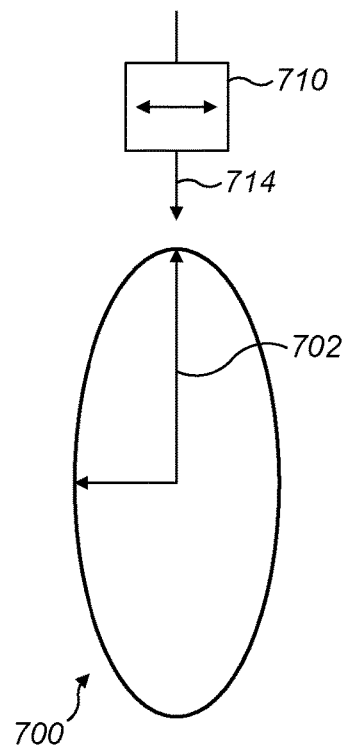

FIG. 7*a* again shows the first state in accordance with embodiments. FIG. 7*d* shows the second state in accordance with the down-the-barrel embodiment. FIGS. 7*b* and 7*c* represent two intermediate rotational states between the first state and the second state In the second state illustrated by FIG. 7*d*, the director 702 is still in the plane of incidence but, additionally, it is also collinear with the k-vector 714 of the incident light. Therefore, in this particular example, the electro-optical configuration is selected so that the k-vector 714 will align with the first axis 702 and director of the liquid crystal 700, when it is in its second state.

The inventors have recognised that, in the configuration of FIGS. 7*a* to 7*d*, there is substantially no rotation of the polarisation of the beam. The reason for this is that, when the incident light is directed along the optic axis, then both the p- and s-polarized components of the incident beam experience the ordinary refractive index $n_o$.

As may be understood from FIGS. 7*a* to 7*d*, the liquid crystal director 702 rotates about two orthogonal axes during transition between the first and second state. In other words, the liquid crystal 700 has undergone in-plane and out-of-plane rotation. The plane of rotation of the liquid crystal director 702 is parallel to the plane of vibration 710 of the incident light. In other words, the liquid crystal director 702 rotates in the plane of vibration 710 of the incident light during the entire transition shown in FIG. 7. This is shown in FIG. 8. FIGS. 8*a* to 8*d* correspond to FIGS. 7*a* to 7*d*, respectively. In some embodiments, the first state (FIG. 7*a*) corresponds to the electric field being on (V=V) and the second state (FIG. 7*d*) corresponds to the electric field being off (V=0).

The orientation of the liquid crystals 700 in the second state (FIG. 7*d*) may be achieved using at least one surface alignment layer. It is known in the art how to provide relatively high surface alignment angles. For example, the LCoS SLM device may further comprise at least one liquid crystal alignment layer. The liquid crystal alignment layer may be arranged to provide a liquid crystal pretilt angle between the director of the liquid crystal and the silicon backplane, which is greater than 20 degrees such as greater than 40 degrees or greater than 60 degrees.

The first state (FIG. 7*a*), in this down-the-barrel embodiment, may correspond to the maximum voltage state. In this arrangement, the electric field is used to pull the liquid crystals down to a planar state. The skilled person will understand how to use an electric field to overcome the surface pre-tilt and align in the director as shown in FIG. 7*a*.

The first state (FIG. 7*a*), in this down-the-barrel embodiment, may correspond to the maximum voltage state. In this arrangement, the electric field is used to pull the liquid crystals down to a planar state. The skilled person will understand how to use an electric field to overcome the surface pre-tilt and align in the director as shown in FIG. 7*a*.

In summary, the second direction may be parallel to or collinear with the k-vector of the light incident upon the spatial light modulator. An important special case occurs when the optic axis of the liquid crystal is tilted into the incident direction. In this case there is no polarisation crossover at intermediate positions and the phase modulation is both full (i.e. the full birefringence of the liquid crystal used) and the modulation is phase-only (i.e. no polarisation crossover). In this case, the plane of rotation corresponds to the plane of the polarisation and the wave vector of the incident light.

Rotation between the first direction and second direction may comprises in-plane rotation and out-of-plane rotation.

The director of the liquid crystals may be maintained in the first direction by an electric field and, in the absence of the electric field, maintained in the second direction by a liquid crystal alignment layer.

The angle between the first direction and second direction in the plane of rotation may be substantially 90 degrees.

The phase pattern may comprise at least one selected from the group comprising: a hologram; a lensing function such as a Fresnel lens; and a beam-steering function such as a phase-ramp function.

The spatial light modulator may be a liquid crystal on silicon spatial light modulator.

Structured Illumination

Oblique incidence has a couple of downsides:
(1) Fringing fields at the pixel edges reduce the area of a pixel that accurately modulates the light beam with the correct phase delay. Whilst this is also a problem with conventional uniform normal incidence illumination, it is a more severe problem with oblique incidence.
(2) Some obliquely incident light that is reflected by a particular pixel mirror will be partly modulated by the neighbouring pixels that also intersect the plane of incidence. If the light modulator is being used for holographic projection, this also damages the integrity of the holographic replay field.

These problems only get worse as pixel size decreases and approaches the liquid crystal thickness. However, the inventors have addressed these yet further problems.

In some embodiments, the illumination strategy is structured illumination, meaning that the light incident on the phase modulator is not a collimated wavefront but an array of beamlets which target individual pixels. Each pixel of the phase modulator receives light from a respective beamlet. Each pixel of the phase modulator receives light from one only beamlet. Each beamlet illuminates only one pixel of the phase modulator. There is a one-to-one correlation between the beamlets and pixels. Each beamlet of the structured illumination corresponds to a pixel of the phase modulator. There may be the same number of beamlets and pixels. The light pattern formed by the array of beamlets spatially corresponds to the array of pixels of the phase modulator.

The inventors have appreciated that the use of structured illumination which produces spots on the pixels can be used advantageously in holographic applications to approach point sources, which allows the optical arrangement to closely match the algorithms which are used for calculating the hologram.

Figure 9:
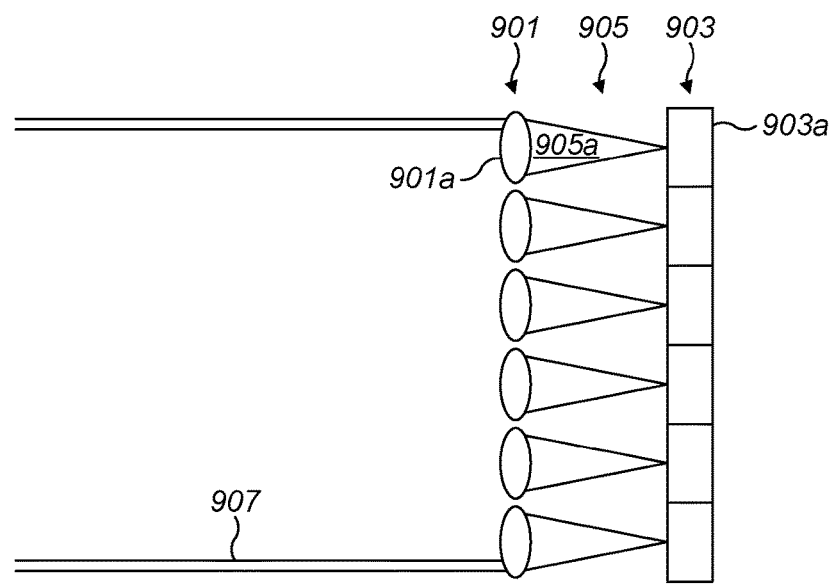
FIG. 9 shows a microlens array for providing structured illumination.

A first embodiment of structured illumination uses a microlens or microlenslet array to form the light pattern. FIG. 9 shows a microlens array 901 comprising an array of the microlenses including microlens 901a. Further shown in FIG. 9 is a spatial light modulator comprising a pixel array 903 including pixel 903a. The microlens array 901 is illuminated with collimated light 907 to form a beamlet array 905 including beamlet 905a. Each microlens of the microlens array 901 receives a portion of the collimated light 907. In the embodiment shown, microlens 901a receives a first portion of the collimated light 907 to form a beamlet 905a which focuses onto pixel 903a. Each microlens forms a respective beamlet which illuminates a respective pixel. There is therefore a one-to-one correlation between the microlenses, beamlets and pixels. In some embodiments, each beamlet is focused onto the centre of the corresponding pixel. If the spatial light modulator comprises [m×n] pixels, the microlens array will comprise [m×n] microlenslets. In some embodiments, m=2n and, optionally n=128, 256, 512, 1024 or 2048.

In some embodiments, the numerical aperture of each microlenslet is 0.05 to 0.25 such as 0.1. Each light spot may have a diameter of 2 to 20 times the wavelength, λ, such as 5λ. In some embodiments, the microlenses have apertures greater than 15 μm and F-number>0.65. The fill factor may be up to 100%. In some embodiments, the microlens are made out of fused silica but materials may be equally suitable as the person skilled in the art will understand. In some embodiments, the phase modulator is reflective and the collimated wave is reconstituted after reflection of the focused beams from the centres of each pixel of the phase modulator.

Figure 10:
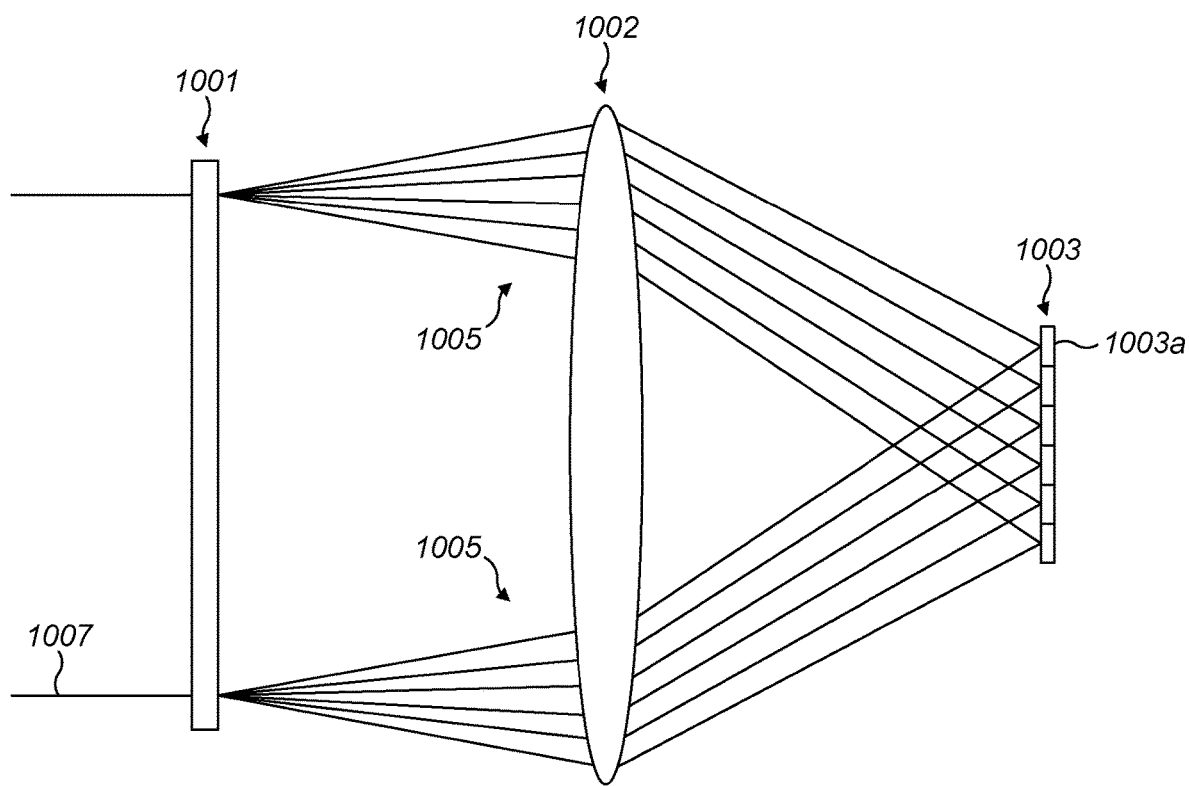
FIG. 10 shows a DOE for providing structured illumination.

A second embodiment of structured illumination uses a spot-generating hologram (not to be confused with the hologram displayed on the phase modulator) to form the light pattern. The spot-generating hologram may be a diffractive optic element, "DOE". FIG. 10 shows a DOE 1001 arranged to receive collimated light 1007. In this embodiment, the DOE 1001 is used in a Fourier arrangement to form an array of light spots. FIG. 10 shows a Fourier lens 1002 arranged to receive diffracted light 1005 from the DOE 1001 and form the array of spots on a plane containing the phase modulator. The phase modulator comprises a pixel array 1003 including pixel 1003a. Each pixel of the phase modulator is illuminated by a respective light spot. The array of light spots corresponds to the pixel array. In some embodiments, the DOE is a fixed structure. The DOE may be made by lithography or optical recording on a high resolution holographic medium. It is known in the art how to make a suitable spot-generating DOE for normal incidence.

It is more complex to calculate the DOE and construct the optical configuration when oblique incidence is implemented in accordance with this disclosure. However, a method of calculating the DOE is disclosed in U.S. Pat. No. 5,982,954. The Equations and Figures referenced in this paragraph are Equations and Figures of U.S. Pat. No. 5,982,954. For example, starting from an array of spots centred on the pixels, the spatial frequency spectrum is calculated using Equation 5. This is propagated to the plane of the DOE whose centre is at a distance z from the centre of the pixel array. Then, the propagated spatial frequency spectrum is inverse Fourier transformed, as per Equation 7, taking care to translate the spatial frequencies according to FIG. 4. The translation of spatial frequencies implies that the DOE will be composed of high spatial frequencies to get large angles of incidence on the backplane which is not a problem for a fixed DOE.

For the avoidance of doubt, the use of structured illumination in combination with oblique incidence is optional. That is, oblique incidence may be used without structured illumination and structured illumination may be used without oblique incidence. A uniform intensity collimated beam may be used to obliquely illuminate the entire array of pixels. Structured illuminated may be used for normal incidence. However, for angles of incidence greater than 10 degrees, the advantages of structured illumination begin to outweigh the complexities introduced by using structured illumination. Therefore, in embodiments, the angle of incidence is greater than 20 degrees, such as greater than 40 degrees or greater than 60 degrees, and structured illumination is used to reduce light losses.

In summary, the projector may be arranged to project a light pattern. The projector comprises a spatial light modulator and a light source. The spatial light modulator has an array of pixels arranged to display a phase pattern. The array of pixels may be a substantially planar array of pixels. Each pixel comprises liquid crystals having a director rotatable in a plane of rotation between a first direction and a second direction. The light source is arranged to illuminate the array of pixels with polarised light such that the light is spatially-modulated in accordance with the phase pattern to form the light pattern. It may be said that the light pattern corresponds to the phase pattern. The polarised light is structured light comprising a plurality of light spots. Each light spot illuminates a respective pixel of the array of pixels.

More specifically, structured light is a light pattern comprising a plurality of individual light spots wherein each pixel of the array of pixels is illuminated by a respective light spot of the plurality of individual light spots. Yet more specifically, the spatial profile of the polarised light comprises a plurality of individual or discrete light spots. There is a one-to-one relationship between the light spots and the pixels. Each light spot illuminates only one pixel of the array of pixels. The number of light spots may be equal to or greater than the number of pixels.

Structured illumination is advantageous because it allows the effects of fringing fields to be reduced or even eliminated and it reduces or even prevents pixel crosstalk such as light crossing over into adjacent pixels.

The light source may comprise a spot-generating hologram (or diffractive optic element) or microlenslet array arranged to form the structured light.

The structured illumination comprises light spots that are smaller than the pixels. The diameter of each light spot may be less than a smallest dimension of the pixel (e.g. pixel width). For example, the diameter of each light spot may be less than 90%—such as less than 85% or less than 80% or less than 75%—the pixel size or smallest pixel dimension. Each microlens may have a numerical aperture of 0.05 to 0.25 such as 0.1 to 0.2.

The projector may further comprise a hologram generation engine arranged to generate the phase pattern using an iterative phase retrieval algorithm. Structured illumination is further advantageous in computer-generated holography because it better reflects the mathematic assumptions or conditions during hologram calculation. Specifically, it is more consistent with computational algorithms that assumes each pixel acts as a point source of light. Computer-implemented algorithms are based on the Huygens-Fresnel principle that each point on a wavefront acts as a source of spherical wavelets.

The structured illumination may be incident upon the array of pixels at an oblique angle. That is, structured illumination may be combined with oblique incidence. The angle of incidence of the structured light on the array of pixels may be greater than zero. Oblique incidence allows the thickness of the liquid crystal layer to be decreased and therefore the switching speed to be increased. Structured illumination is particularly advantageous with oblique incidence because it allows the effects of fringing fields to be reduced or even eliminated.

The pixels may be rectangular. The length to width aspect ratio of each pixel may be such that the light received by each pixel does not crossover into another pixel owing to the angle of incidence. In accordance with this disclosure, the length of the pixel is parallel to the plane of incidence of the polarised light. The width of the pixel is perpendicular to the length. There is a lower limit to the size of the light spots of the structured illumination.

The use of rectangular pixels with structured illumination allows the pixel size dimensions to be optimised.

The length to width aspect ratio of each pixel may be in the range 2:1 to 5:1. Traversal of the light ray through the liquid crystal volume above adjacent pixels in the long axis can be avoided. This will reduce interpixel crosstalk.

The phase pattern may comprise at least one selected from the group comprising: a hologram; a lensing function such as a Fresnel lens; and a beam-steering function such as a phase-ramp function.

There is also disclosed herein a method of projecting a light pattern. The method comprises a first step of displaying a phase pattern on an array of pixels of a spatial light modulator. Each pixel comprises liquid crystals having a director. The director is rotatable in a plane of rotation between a first direction and a second direction. The method comprises a second step of illuminating the phase pattern with polarised light. The polarised light is therefore spatially-modulated in accordance with the phase pattern to form the light pattern. The polarised light is structured light. The structured light (or illumination) comprises a plurality of light spots. Each light spot is arranged to illuminate a respective pixel of the array of pixels.

The method may further comprise calculating the phase pattern using an iterative phase retrieval algorithm. The method may further comprise receiving polarised light. The method may further comprise structuring the light using a spot-generating hologram or microlenslet array to form the structured light.

The light pattern may be projected onto a projection plane. The light pattern may be a 3D light pattern projected onto a projection volume. The projection plane or projection volume is spatially-separated from the spatial light modulator.

Access Prism

Figure 11:
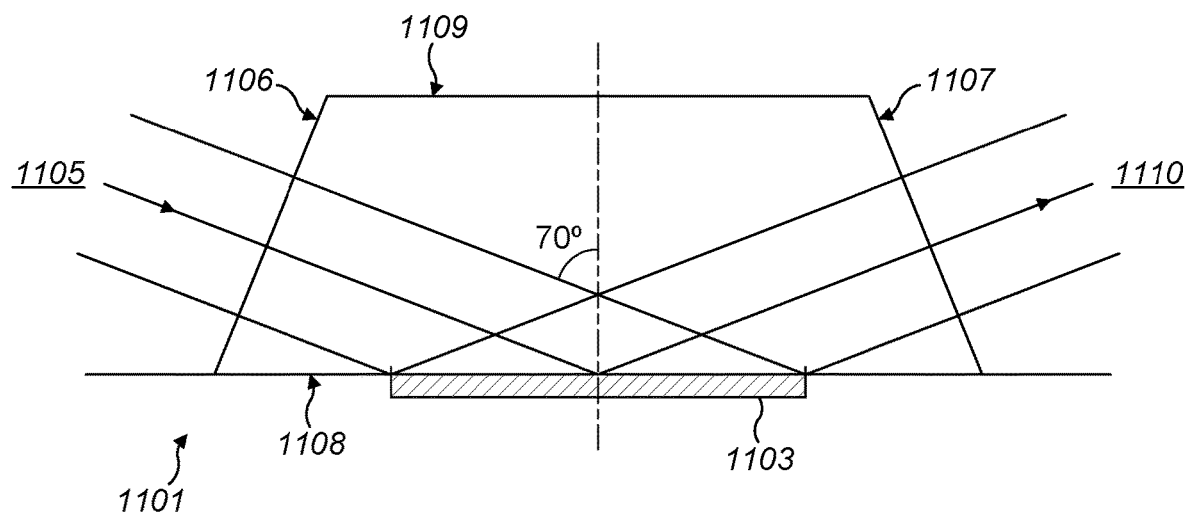
FIG. 11 shows an access prism.

In some embodiments, a so-called access prism is used as part of the optical configuration which facilitates oblique incidence and, optionally, structured illumination. FIG. 11 shows the access prism 1101 mounted on the liquid crystal layer 1103 of the phase modulator. The access prism is trapezoidal with the longest side forming a base 1108 mounted to the liquid crystal layer 1103 of the phase modulator. The access prism further has a top surface 1109 which is parallel to the liquid crystal layer 1103. The side surfaces 1106, 1107 are inclined with respect to the surface normal of the liquid crystal layer 1103. A first side surface 1106 receives polarised light 1105. The received polarised light 1105 illuminates the pixel array. Phase modulated light 1110 is output in reflection. The phase modulated light 1110 exits the access prism 1101 through the second side surface 1107. In this example, the angle of incidence on the liquid crystal layer is 70 degrees.

The light is normally incident on the first side surface 1106 of the access prism 1101. The angle between the first side surface 1106 and base 1108 is equal to the desired angle of incidence of the light on the liquid crystal layer. The light does not therefore refract towards to the surface normal of the liquid crystal layer 1103. Accordingly, the angle of incidence is not reduced by entry into the prism which may be made of, for example, glass with a refractive index of 1.5. The access prism therefore functions as a cover glass for the liquid crystal layer that preserves the angle of incidence.

Pixel Structure

A consequence of oblique incidence is that light enters and exits the liquid crystal layer at different points. More specifically, the entrance and exit point of an example light ray are separated by a distance dependent upon the angle of incidence. In some embodiments of oblique incidence, the phase modulator is reflective and each pixel is elongated in the direction parallel to the plane of incidence. In some embodiments of oblique incidence, the pixels therefore have an aspect ratio. The length to width aspect ratio of each pixel may be 2:1 to 5:1, wherein the length is parallel to the plane of incidence and the width is perpendicular to the length.

Figure 12:
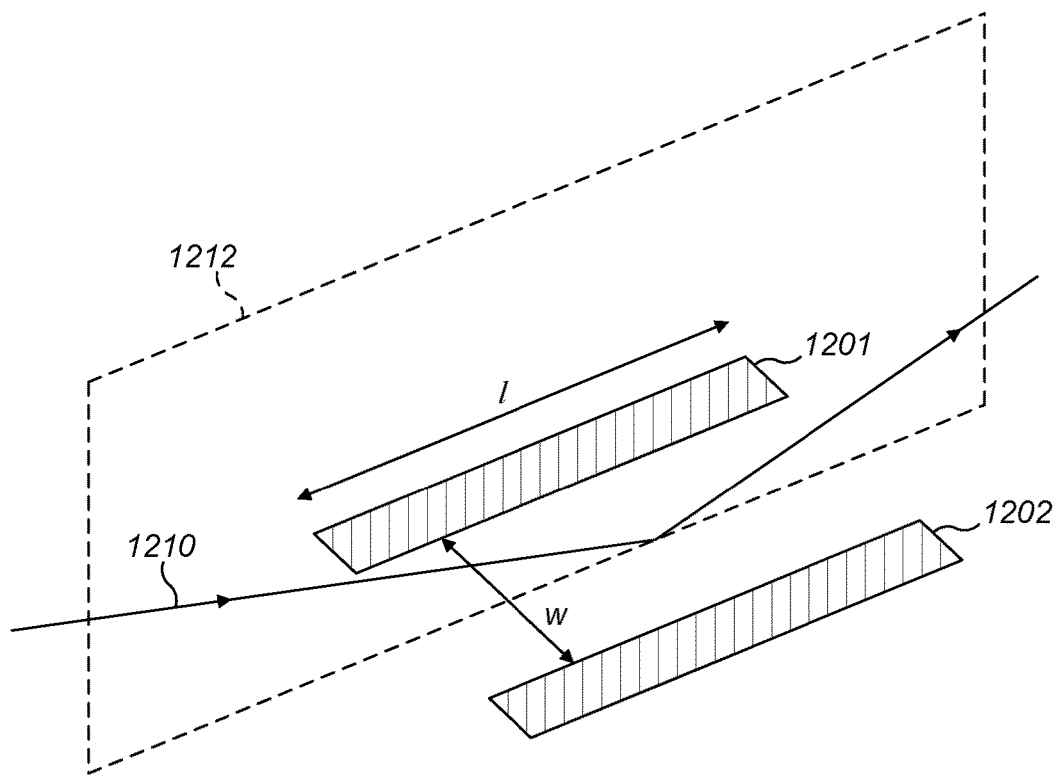
FIG. 12 shows an example pixel structure for oblique incidence.

An example pixel structure for oblique incidence is shown in FIG. 12. The pixel structure comprises two metal strip electrodes 1201, 1202 of length, l, separated by a distance, w. In this example, l=12 μm, w=4 μm and the angle of incidence of the incidence light 1210 is 70 degrees. FIG. 12 shows the plane of incidence 1212. In this example, the electrodes are lateral and this configuration provides in-plane switching but the principles described in this example extend to configurations which provide out-of-plane switching. Thin liquid crystal layers can be used (with high speed) but the resolution of the phase modulator is reduced. There is a trade-off between speed and resolution by varying the angle of incidence. Lower angles of incidence give higher resolution but decreased speed. The thinness of the liquid layer advantageously allows accurate spacers to be produced photo-lithographically as part of the VLSI (Very Large Scale Integration) process. The first example may be used with structured illumination. In this case, the diameter of each spot of the structured illumination would be no more than the smallest pixel dimension i.e. less than or equal to 4 µm.

It should be clear to the reader that electrode pairs that traverse the liquid crystal layer—and provide, for example, planar to homeotropic liquid crystal transitions—can be stretched in the same way to accommodate oblique incidence.

Reflective LCoS Device for In-Plane Switching

In some embodiments, in-plane switching may be used to provide the liquid crystal rotations described. The down-the-barrel scheme described with reference to FIGS. 7a to 7d may be achieved using in-plane switching. Liquid crystal switching between the first state of FIG. 6a and the second example of the second state of FIG. 6c or third example of the second state of FIG. 6d may also be achieved using in-plane switching. In-plane switching is usually used in transmissive devices. A zig-zag structure of the in-plane electrodes is used in conventional in-plane switching liquid crystal displays for the purpose of improving the viewing angle. However, this is unnecessary in phase-modulating devices.

Figure 14:
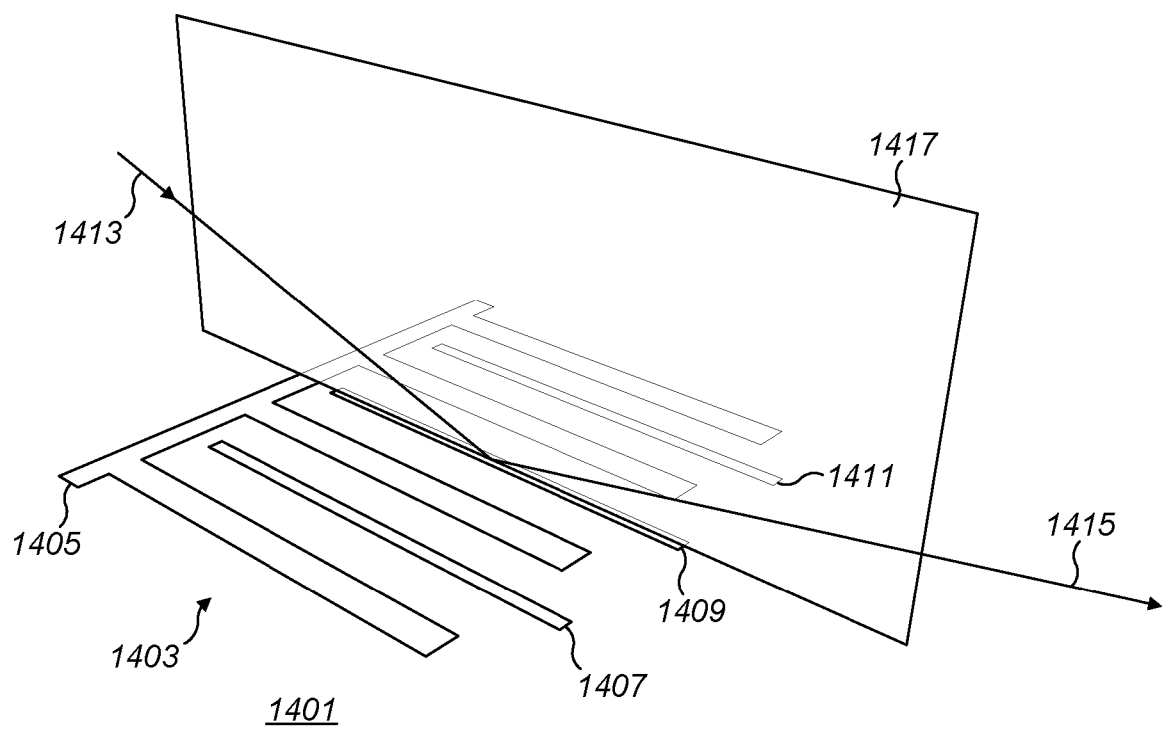
FIG. 14 shows an in-plane electrode structure for in-plane switching.

An example electrode structure for in-plane switching of reflective LCoS devices in accordance with this disclosure is shown in FIG. 14. FIG. 14 shows an in-plane aluminium electrode structure 1403 on the silicon surface 1401 of a silicon backplane VLSI chip. Three pixels are shown by way of example only. The pixels are formed by electrode structure 1403. The electrode structure 1403 comprises a common electrode bus 1405, a first pixel electrode 1407, a second pixel electrode 1409 and a third pixel electrode 1411. The electrode structure 1403 switches the liquid crystal director in the plane of the silicon surface 1401 and parallel to the common electrode bus 1405. The pixels are elongated in the direction of the plane of incidence 1417. FIG. 14 shows an example incident ray 1413 and the corresponding reflected ray 1415 in the plane of incidence 1417. The phase of the light of the reflected ray 1415 is, of course, controlled by the orientation of the director of the liquid crystal. The orientation of the director of the liquid crystal is controlled by the voltage between the pixel electrode of the pixel that is illuminated and the common electrode.

By way of example, for severe oblique incidence at 70 degrees to the surface normal and 20 degrees to the silicon surface, the pixel width might be 4 microns and the pixel length 12 microns. A smaller length to width ratio would be used for light incident less obliquely. The size and thickness of the aluminium electrodes depends on the feature sizes allowed with the VLSI process used to fabricate the silicon backplane. For example, the common electrode width may be 200 nm and the pixel voltage electrodes might be significantly narrower. The pixel voltage is therefore applied across a gap for 2 microns for this example of a pixel with a width of 4 microns.

In summary, there is disclosed herein a liquid crystal on silicon spatial light modulator, "LCoS SLM", device arranged for in-plane switching. The LCoS SLM device comprises: a silicon backplane; a transparent substrate; a liquid crystal layer; an electrode structure and a reflective component. The liquid crystal layer is interposed between the silicon backplane and transparent substrate. The electrode structure is formed on the silicon backplane for generating an electric field in the liquid crystal layer. The electric field is substantially parallel to the silicon backplane. The reflective component is opposing the transparent substrate.

The opposing reflective component and transparent substance define a cell gap which may be filled with liquid crystal. The LCoS SLM device may be a phase modulator. The electrode structure may comprise a common electrode and plurality of pixel electrodes. The common electrode and plurality of pixel electrodes may be substantially planar. The common electrode and plurality of pixel electrodes may be contained within a plane parallel to the silicon backplane. The electrodes in this configuration may be described as lateral electrodes.

There are disclosed herein concepts that unlock improvements in the performance of a liquid crystal on silicon light modulator, such as a phase modulator, that are otherwise not yet achievable. The inventors have adopted a completely different approach to tackling some fundamental limitations of liquid crystal display such as switching speed. The improvements achieved are realised by using specific optical and electro-optical schemes which benefit from a new type of LCoS device. The inventors disclose herein an LCoS device in which the electric field generated by the electrodes is parallel to the silicon backplane.

Whilst in-plane switching has been previously disclosed for conventional display, the skilled artesian understands that the advantages of in-plane switching are not conventionally realisable in LCoS. Significantly, examples disclosed herein use in-plane electrodes. This does not have conventionally good synergy with LCoS. For example, as the skilled reader will know, in-plane switching IPS originated as a way of addressing some limitations of the twisted nematic field effect such as strong viewing angle dependence and low-quality colour reproduction. These problems are more relevant for LCDs than for LCOS and, as such, in-plane switching was not originally contemplated for use with LCOS. In addition, use of lateral electrodes for in-plane switching takes up space in the display plane. Hence it reduces the 'fill factor' of a pixel array. This is typically not a significant problem for the size of pixels used in, for example, TV direct view displays. However, according to conventional practice, for the relatively small pixels of LCOS devices, it could be very serious. In the present disclosure we address this problem by, at least in some embodiments, using structured illumination that predominantly illuminates the centre of each pixel. In addition, in embodiments that use oblique illumination, any potential problems caused by the reflectivity of the substrate are addressed, as will be understood further from the detailed examples below.

Thus, it becomes apparent that the advantages of in-plane electrodes can, in fact, outweigh the disadvantages when the special cases disclosed herein are understood.

The LCoS SLM device may further comprise at least one liquid crystal alignment layer. The liquid crystal alignment layer may be arranged to provide a liquid crystal pretilt angle greater than 20 degrees such as greater than 40 degrees or greater than 60 degrees. The pretilt angle is an angle between the director of the liquid crystal and the silicon backplane. At least one alignment layer is used to provide a relatively high pretilt angle in order that the so-called down-the-barrel configuration can be implemented.

The electric field provided by the electrode structure rotates the liquid crystal by substantially 90 degrees in a plane of rotation. Accordingly, a full $2\pi$ of phase modulation may be achieved.

A conventional continuous metal mirror reflector cannot be used for in-plane switching because it would short out the lateral electric field. In yet further advances, the inventors have addressed this problem and devised three device structures to facilitate in-plane switching in an LCoS device.

(i) Brewster's Angle

Figure 13:
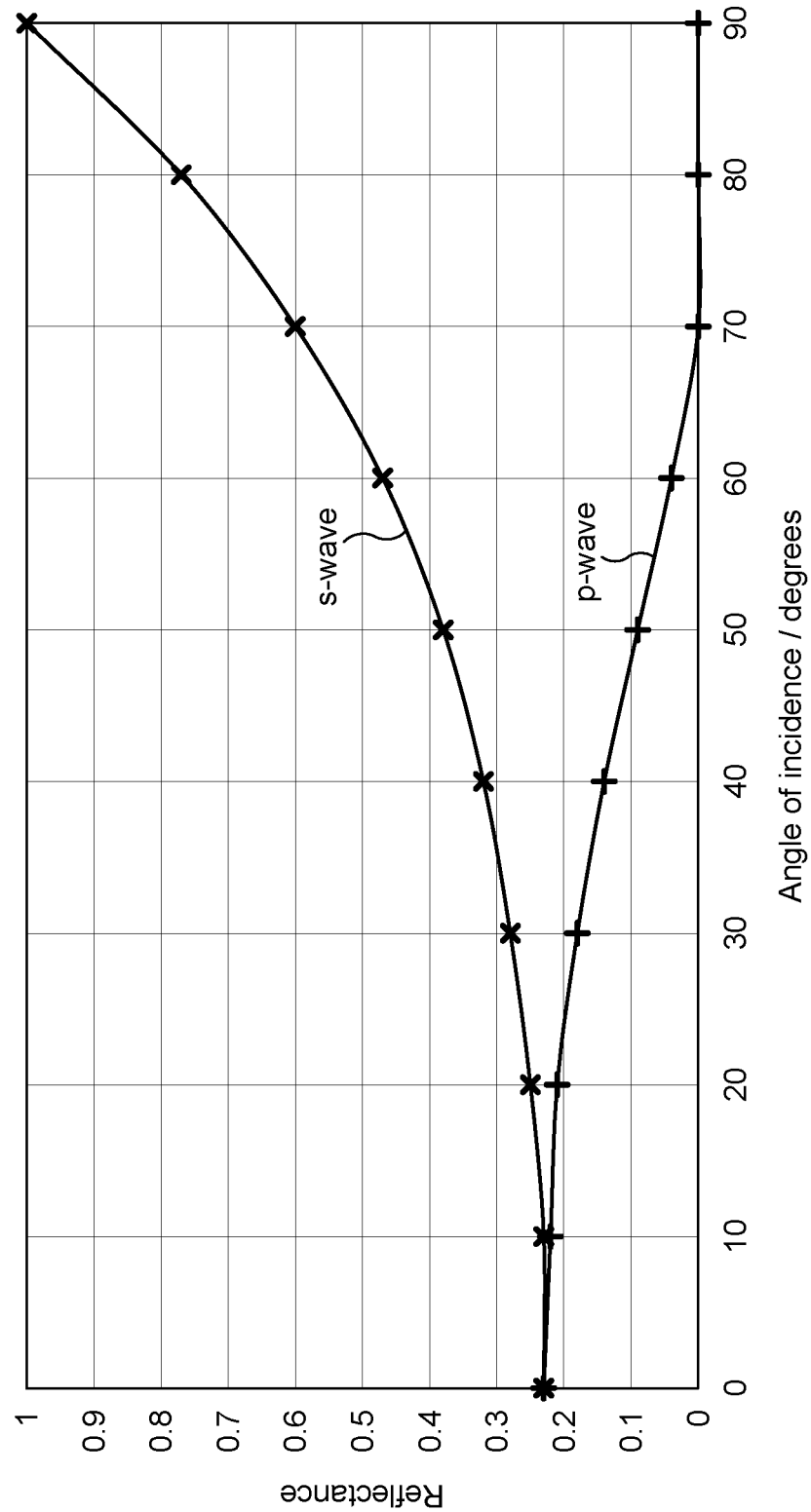
FIG. 13 is representative of the reflectance of a liquid crystal-silicon interface.

In a first example, the bare silicon surface of the backplane chip is used as the reflector. Silicon has a reflectance at normal incidence of only about 15% which is unlikely to be acceptable. However, the reflectivity of silicon increases to about 60% when the angle of incidence is Brewster angle. At this special angle, the reflected light is completely polarised orthogonal to the plane of incidence. The reflected light is therefore polarised in the direction shown in FIGS. 6 and 7 which means that an additional polarised is not required to implement the oblique incidence schemes disclosed herein. Liquid crystal has a refractive index of approximately 1.5 and silicon has a refractive index of approximately 4. FIG. 13 shows the reflectance of the interface between a material having a refractive index of 1.5 and a material having a refractive index of 4. Brewster's angle for this interface is 69 degrees. FIG. 13 is therefore representative of a liquid crystal-silicon interface. An advantage of this approach is that it involves no extra processing of the LCOS backplane.

In summary, the reflective component may be formed by the interface between liquid crystal of the liquid crystal layer and the silicon backplane. In some examples, the device is obliquely illuminated in which case the reflectivity at the interface between the liquid crystal and the silicon can be adequate to make a viable device.

(ii) Dielectric Layer or Layers

In an improvement of the first example, the reflectance is further enhanced by using a single thin layer of silicon dioxide on top of the silicon backplane. In some examples, the thickness of the silicon dioxide layer is 200 to 400 nm. For example, the reflectance (of the S-wave) is increased from 59% to 74% by a 300 nm silicon dioxide layer on top of the silicon substrate.

The demands on the silicon dioxide are relaxed by oblique incidence because the relatively high reflectivity of the underlying silicon at oblique incidence—particularly, at Brewster's angle. In some embodiments, the in-plane electrodes are deposited on top of the first dielectric layer (i.e. the silica layer deposited or grown onto the original silicon surface) as part of the VLSI process. This minimises any deformation of the applied electric field caused by the dielectric.

The reflectance can be enhanced further by the addition of at least a second thin dielectric layer. The second dielectric layer may have a thickness less than 400 nm such as less than 300 nm. The second dielectric layer may have a higher refractive index than silicon dioxide. It unlikely that more than two layers would be needed over silicon but, in theory, further dielectric layers could increase the reflectance up to close to 100%, but at the expense of extra processing and increasing thickness of the reflector. In some embodiments, a dielectric stack is used as the reflective surface of the cell containing the liquid crystal. In theory, a dielectric stack reflector can be designed for any chosen angle of incidence and can have an arbitrarily high reflectance. Depending on the angle of incidence and on the choice of the second dielectric, it may be possible to achieve a reflectance considerably greater that 70% with just two dielectric layers, the first of which is the silica layer carrying the electrodes.

In an embodiment, the first dielectric layer is a 200-400 nm layer of silicon dioxide and the second dielectric layer is a 50-400 nm layer of tantalum pentoxide or titanium dioxide. For example, a 50 nm layer of titanium dioxide on top of a 350 nm layer of silicon dioxide gives a reflectivity (of the s-wave) of 93% at 450 nm.

Figure 15:
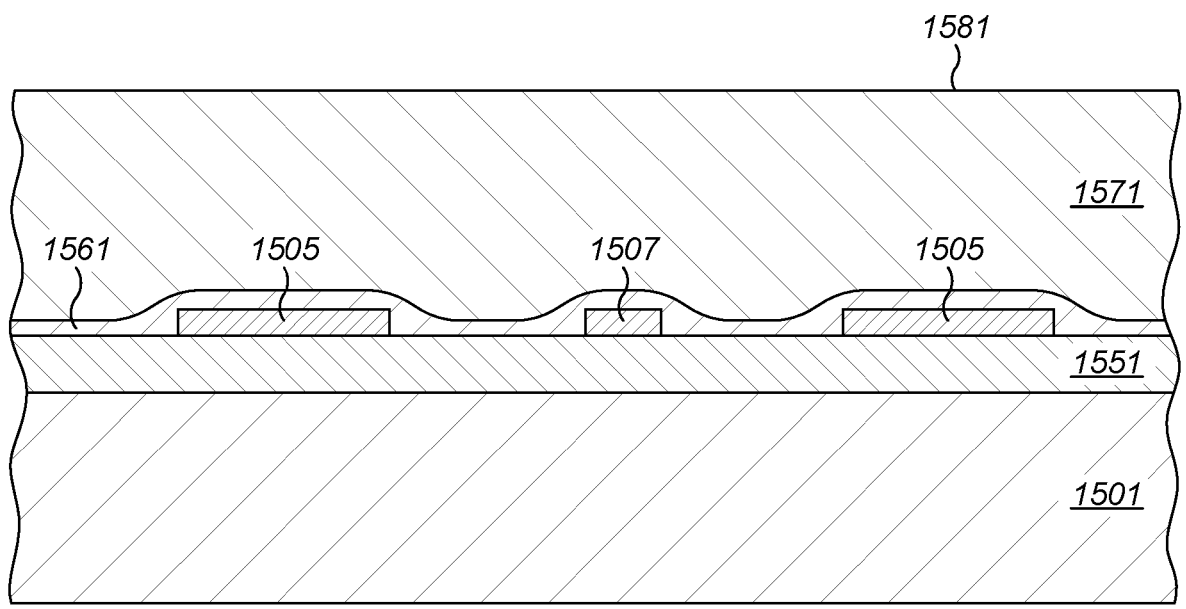
FIG. 15 shows a cross-section of the metal electrodes of an in-plane switching LCOS device for oblique incidence.

FIG. 15 shows a cross-section of the metal electrodes of an in-plane switching LCOS device designed for oblique incidence. The reflector is provided by two transparent dielectric layers placed over the surface of the silicon backplane. In more detail, FIG. 15 shows a stack comprises silicon 1501, a layer of silicon dioxide 1551 on the silicon 1501 and a layer of high refractive index dielectric 1561 on the silicon dioxide 1551. The high refractive index dielectric 1561 may be tantalum pentoxide or titanium dioxide, as described above. FIG. 15 further shows the common electrode 1505 and an example pixel voltage electrode 1507. Finally, FIG. 15 shows the liquid crystal layer 1571 and a front cover glass 1581.

A dielectric stack can deform the electric field applied by the electrodes. However, the inventors have identified that oblique incidence reduces the deformation to the electric field caused by a dielectric stack reflector because the thickness of the stack can be reduced owing to the increased path length caused by the angle. Furthermore, the deformation can be further decreased by forming the first silicon dioxide layers underneath the electrodes. There is therefore good synergy between the use of oblique incidence and a dielectric reflector comprising at least one dielectric layer. Each dielectric layer may have a thickness less than 400 nm.

Advantageously, this example is simple and can easily be adapted easily for any angle of incidence. However, it can becomes less attractive near normal incidence because the dielectric layers need to be thicker.

In summary, the reflective component may additionally or alternatively comprise at least one dielectric layer on the silicon backplane. The dielectric layer is configured (thickness and refractive index) to increase reflectivity.

The at least one dielectric layer may comprise a first dielectric layer of silicon dioxide. A relatively thin layer of silicon dioxide on silicon can significantly increase reflectivity. The first dielectric layer of silicon dioxide may be formed on the silicon backplane as part of a VLSI silicon fabrication process, optionally, before the electrode structure is formed on the silicon backplane. The first dielectric layer may therefore be formed in the silicon foundry. This has significant implications on cost. It is relatively straight forward to encourage the formation of a silicon dioxide layer on the silicon. The first dielectric layer may have a thickness of 200 to 400 nm. At least 200 nm is required to significantly affect reflectivity and less than 400 nm is preferable to prevent diffraction. At least some of the silicon dioxide of the first dielectric layer may be disposed between the silicon backplane and the electrode structure.

The at least one dielectric may comprise a second dielectric layer comprising tantalum pentoxide or titanium dioxide. The thickness of the second dielectric layer is 50 to 400 nm. The second dielectric layer further increases reflectivity. The thickness of the second dielectric layer may be less than the thickness of the first dielectric layer. The inventors have identified that any negative effects on thickness owing to the second dielectric layer are outweighed by the improvement to reflectivity.

(iii) Discontinuous Metal Mirrors

The VLSI process used to fabricate the backplane may have a minimum feature size less than 100 nm. Hence gaps can be left in an aluminium metal reflector whose dimensions are sub-wavelength. In some embodiments, sub-wavelength gaps in the aluminium are provided between the reflecting regions such that the overall reflectance is relatively high. Diffraction from the structure is found to be small. Under these circumstances, an adequate reflector is provided which does not short out the lateral electric field.

In some examples, the aluminium mirror of conventional LCOS devices is made discontinuous by etching narrow gaps into it. If the width of the gaps is significantly less than the wavelength of the light to be reflected then there would be little change in reflectivity compared with a continuous mirror and minimum diffraction from any periodicity in the arrangement of the gaps e.g. the gaps might be 200 nm or preferably less, as allowed by the minimum gap dimensions allowed by the VLSI process used to fabricate the backplane chip (e.g. 20 nm). In some examples, the gaps divide the mirror into five or more separate elements between the common electrode and the pixel voltage electrode in a direction orthogonal to the applied electric field.

Notably, if the gaps in the discontinuous structure are both sub-visible-wavelength and small compared with the mirror elements themselves, it is found that diffraction of incident light from this structure is not be serious problem.

Figure 16A:
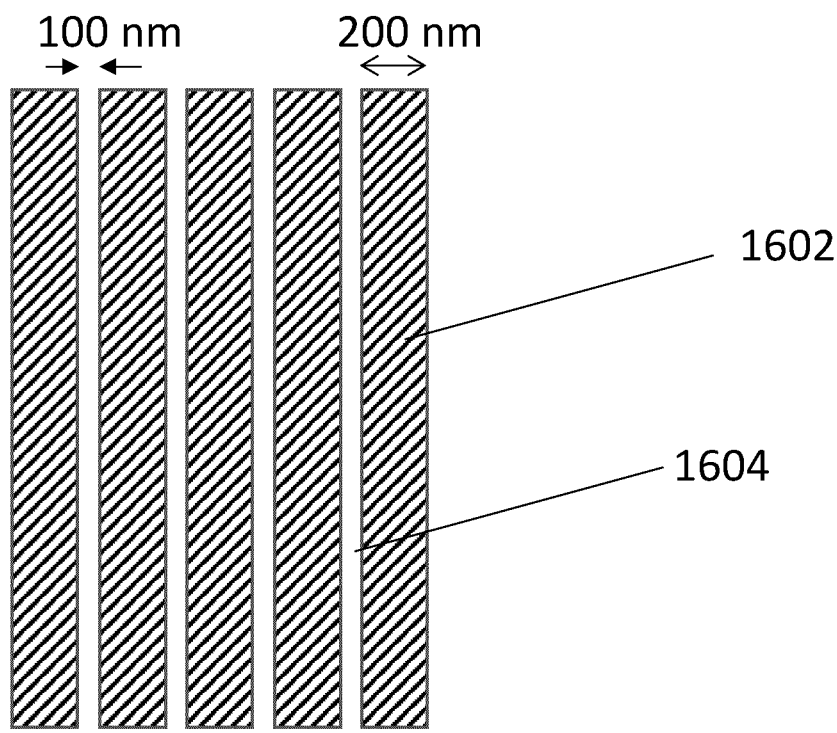
FIG. 16a shows a 1D discontinuous metal mirror.
Figure 16B:
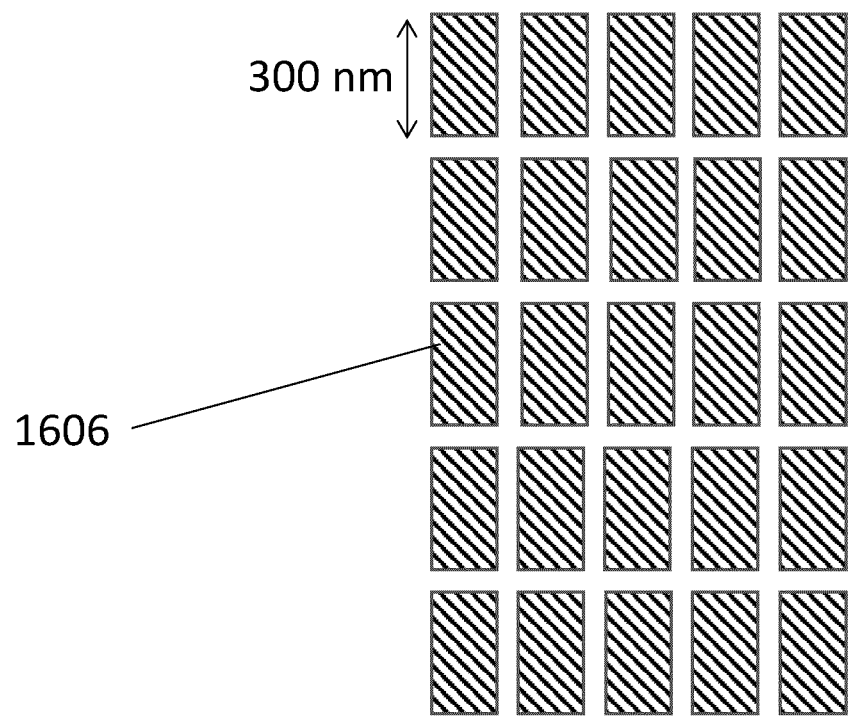
FIG. 16b shows a 2D discontinuous metal mirror.

The term mark-to-space ratio is used herein to describe the ratio between the width of each metal strips and the width of the gap between adjacent metal strips. The mark-to-space ratio of the discontinuous structure may be even. That is, the metal strips are the same width as the gap between adjacent metal strips. However, the inventors have found that better performance is achieved if the mark-to-space ratio is equal to or greater than 2:1. FIG. 16A shows an example in accordance with the present disclosure in which the mark-to-space ratio is 2:1. In this example, the metal strips 1602 are 200 nm wide and the gaps 1604 are 100 nm. The structure of FIG. 16A may be described as a 1D discontinuous metal mirror to indicate that the discontinuations (i.e. gaps) are 1D. The mark-to-space ratio may be 2:1 to 10:1 such as 2:1 to 5:1. FIG. 16B shows an alternative example corresponding to a 2D discontinuous metal mirror. The metal sections may be rectangular and have an aspect ratio of 3:2. In the example shown, the metal sections 1606 are each 300×200 nm and the gaps are 100 nm in both directions. In some examples, the dimensions of the metal section are no greater than 300 nm. Likewise, in some examples, the dimensions of the gaps are no greater than 300 nm. These dimensions are preferred so that diffraction does not become significant.

If such an electrode array were uniformly illuminated, then there might be unwanted diffraction due to the proximity of its dimensions to the wavelength of the illuminating light. However, can be greatly reduced due to the use of structured illumination as disclosed herein. Therefore, in all examples of an LCoS device having in-plane electrodes in this disclosure, structured illumination and an elongated pixel may be preferred. An elongated pixel elongated in the direction of the plane of incidence (as described earlier) e.g. a pixel width of 4 μm allows the structured illumination optics to concentrate light away from the pixel edges and a pixel length of 12 microns allows for the elongation of the beam of incident light.

In summary, the reflective component may additionally or alternatively comprise a discontinuous metal layer comprising sub-wavelength gaps between sub-wavelength metal sections. The term sub-wavelength is used herein to refer to at least one dimension being less than the wavelength of the light for modulation. In some examples, all physical dimensions of the component are less than the wavelength. The discontinuous metal layer is a period component comprising a repeating pattern of metal and gaps, like a grating, in which the periodicity is one dimensional. The discontinuous metal layer is a 1D discontinuous metal layer with a mark-to-space ratio equal to or greater than 2:1 in order to optimise reflectivity and minimise any polarising effects. The sub-wavelength gaps and sub-wavelength metal sections may have a dimension no more than 300 nm in order to prevent diffraction. The discontinuous metal layer may be a 2D discontinuous metal layer and the sub-wavelength metal sections are rectangular.

A system can be formed comprising the LCoS SLM device and a light source. The light source may be arranged to illuminate the device to form an angle of incidence that is greater than zero. That is, oblique incidence is provided. The angle of incidence may be 50 to 80 degrees such as 60 to 70 degrees. The angle of incidence may be approximately equal to Brewster's angle. The incident light may be structured light comprising a plurality of light spots, wherein each light spot is arranged to illuminate a respective pixel of an array of pixels of the device.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A projector arranged to project a light pattern, wherein the projector comprises:
    a spatial light modulator having an array of pixels arranged to display a phase pattern, wherein each pixel comprises liquid crystals having a director rotatable in a plane of rotation between a first direction and a second direction; and
    a light source arranged to illuminate the array of pixels with polarised light such that the light is spatially-modulated in accordance with the phase pattern to form the light pattern, wherein:
    (i) the angle of incidence of the light on the array of pixels is greater than zero and the light is s-polarised;
    (ii) the first direction is parallel to the polarisation direction of the light; and
    (iii) the second direction is in the plane of incidence, and wherein the length to width aspect ratio of each pixel of the array of pixels is 2:1 to 5:1, wherein the length is parallel to the plane of incidence of the polarised light and the width is perpendicular to the length.

2. The projector as claimed in claim 1 wherein the first direction corresponds to a planar state and the second direction corresponds to a homeotropic state.

3. The projector as claimed in claim 1 wherein the first direction corresponds to a first planar state and the second direction corresponds to a second planar state.

4. The projector as claimed in claim 1 wherein rotation between the first direction and second direction comprises in-plane rotation and out-of-plane rotation.

5. The projector as claimed in claim 1 wherein the second direction is parallel to the k-vector of the light incident upon the spatial light modulator.

6. The projector as claimed in claim 5 wherein rotation between the first direction and second direction comprises in-plane rotation and out-of-plane rotation.

7. The projector as claimed in claim 5 wherein the director of the liquid crystals is maintainable in the first direction by an electric field and, in the absence of the electric field, maintained in the second direction by a liquid crystal alignment layer.

8. The projector as claimed in claim 1 wherein the angle between the first direction and second direction on the plane of rotation is substantially 90 degrees.

9. The projector as claimed in claim 1 wherein the illuminating polarised light has a plane of vibration which is coincident with the plane of rotation of the director.

10. The projector as claimed in claim 1 wherein the phase pattern comprises at least one selected from the group comprising: a hologram; a lensing function such as a Fresnel lens; and a beam-steering function.

11. The projector as claimed in claim 1 wherein the spatial light modulator is a liquid crystal on silicon spatial light modulator.

12. The projector as claimed in claim 11 wherein the angle of incidence of the light on the array of pixels is approximately equal to Brewster's angle for silicon.

13. The projector as claimed in claim 11 wherein the silicon surface of the liquid crystal on silicon spatial light modulator is coated with $SiO_2$.

14. The projector as claimed in claim 12 further comprising a spot-generating hologram or microlenslet array arranged to form the structured light.

15. The projector as claimed in claim 1 wherein the light incidence upon the array of pixels is structured light comprising a plurality of light spots, wherein each light spot is arranged to illuminate a respective pixel of the array of pixels.

16. The projector as claimed in claim 1 wherein the light pattern is a holographic reconstruction.

17. The projector as claimed in claim 1, wherein the projector is arranged to maintain the director of the liquid crystals substantially in the direction upon application of an electric field, and to maintain the director of the liquid crystals substantially in the second direction in the absence of an electric field, or vice versa.

18. A method of projecting a light pattern, the method comprising:

displaying a phase pattern on an array of pixels of a spatial light modulator, wherein each pixel comprises liquid crystals having a director rotatable in a plane of rotation between a first direction and a second direction; and illuminating the phase pattern with polarized light such that the light is spatially-modulated in accordance with the phase pattern to form the light pattern, wherein:

(i) the angle of incidence of the light on the array of pixels is greater than zero and the light is s-polarised;

(ii) the first direction is parallel to the polarisation direction of the light; and (iii) the second direction is in the plane of incidence, and wherein the length to width aspect ratio of each pixel of the array of pixels is 2:1 to 5:1, wherein the length is parallel to the plane of incidence of the polarised light and the width is perpendicular to the length.

19. The method as claim in claim 18 wherein the polarised light is structured light comprising a plurality of light spots in which each light spot is arranged to illuminate a respective pixel of the array of pixels.

20. A projector arranged to project a light pattern, wherein the projector comprises:

a spatial light modulator having an array of pixels arranged to display a phase pattern, wherein each pixel comprises liquid crystals having a director rotatable in a plane of rotation between a first direction and a second direction, wherein the silicon surface of the liquid crystal on silicon spatial light modulator is coated with $SiO_2$; and a light source arranged to illuminate the array of pixels with polarised light such that the light is spatially-modulated in accordance with the phase pattern to form the light pattern, wherein:

(i) the angle of incidence of the light on the array of pixels is greater than zero and the light is s-polarised;

(ii) the first direction is parallel to the polarisation direction of the light; and (iii) the second direction is in the plane of incidence.

21. The projector as claimed in claim 20, wherein the $SiO_2$ has a thickness in the range of 50-500 nm.

22. A method of projecting a light pattern, the method comprising:

providing the projector as claimed in claim 20;

displaying a phase pattern on the array of pixels of the spatial light modulator of the projector; and illuminating the phase pattern with polarized light from the light source, such that the light is spatially-modulated in accordance with the phase pattern to form the light pattern.

* * * * *